(12) United States Patent
Morishita

(10) Patent No.: US 11,647,144 B2
(45) Date of Patent: *May 9, 2023

(54) INFORMATION PROCESSING APPARATUS, RECORDING MEDIUM STORING USER MANAGEMENT PROGRAM, AND USER MANAGEMENT METHOD

(71) Applicant: SHARP KABUSHIKI KAISHA, Sakai (JP)

(72) Inventor: Masahiro Morishita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,731

(22) Filed: Dec. 28, 2021

(65) Prior Publication Data

US 2022/0124220 A1 Apr. 21, 2022

Related U.S. Application Data

(63) Continuation of application No. 17/075,109, filed on Oct. 20, 2020, now Pat. No. 11,245,812.

(30) Foreign Application Priority Data

Oct. 25, 2019 (JP) .............................. JP2019-193961

(51) Int. Cl.
*H04N 1/44* (2006.01)
*H04N 1/32* (2006.01)

(52) U.S. Cl.
CPC ....... *H04N 1/4413* (2013.01); *H04N 1/32368* (2013.01); *H04N 1/4433* (2013.01)

(58) Field of Classification Search
CPC .. H04N 1/4406; H04N 1/4413; H04N 1/4433; H04N 1/32368; H04N 2201/3205

(Continued)

(56) References Cited

U.S. PATENT DOCUMENTS

2009/0293108 A1 11/2009 Weeden
2010/0024005 A1 1/2010 Huang et al.
(Continued)

FOREIGN PATENT DOCUMENTS

JP 2015-227048 A 12/2015

OTHER PUBLICATIONS

Non-Final Office Action of U.S. Appl. No. 17/075,109 dated Jun. 24, 2021.
(Continued)

*Primary Examiner* — Kent Yip
(74) *Attorney, Agent, or Firm* — ScienBiziP, P.C.

(57) ABSTRACT

A multifunction peripheral stores normal user information for executing user authentication in and an auxiliary storage. The multifunction peripheral has a quick login mode for simple authentication. When registering a new user in the quick login mode, the CPU determines whether a login name in the normal user information of an existing user matches a login name of the new user. When the two login names match, the user is allowed to select whether to associate the new user with the existing user. When selected to associate the new user with the existing user, the quick user information of the new user including the first management information and the second management information is generated using at least user ID in the normal user information of the existing user, the first management information is stored in the auxiliary storage, and the second management information is stored in a main storage.

6 Claims, 20 Drawing Sheets

(58) Field of Classification Search
USPC .......................................................... 358/1.15
See application file for complete search history.

(56) References Cited

U.S. PATENT DOCUMENTS

2015/0324675 A1* 11/2015 Morii ................... H04N 1/4426
358/1.14
2020/0137243 A1* 4/2020 Okada ................ H04N 1/00474

OTHER PUBLICATIONS

Notice of Allowance of U.S. Appl. No. 17/075,109 dated Oct. 14, 2021.

* cited by examiner

INFORMATION PROCESSING APPARATUS, RECORDING MEDIUM STORING USER MANAGEMENT PROGRAM, AND USER MANAGEMENT METHOD

BACKGROUND OF THE INVENTION

Field of the Invention

The present invention relates to an information processing apparatus, a recording medium storing a user management program, and a user management method, and more particularly to an information processing apparatus, a recording medium storing a user management program, and a user management method having a function of simply accepting user authentication by selecting a user icon, for example.

Description of the Background Art

An example of such a technology is disclosed in Japanese Unexamined Patent Publication No, 2015-227048. The image processing apparatus disclosed in the patent retrieves user information based on a user who logs in by selecting a user icon displayed on a display and a user who logs in according to the communication with a card, and executes login processing for the retrieved user.

An image forming apparatus of the background art has an object to reduce time and effort for entering a login ID and a password as authentication information in the image forming apparatus having a function of executing user authentication from a viewpoint of security.

However, according to the image forming apparatus of the background art, in the image forming apparatus in which the user information including the authentication information such as the login ID and the password is registered, it is not considered to add the function of retrieving the user information based on the user who logs in by selecting the user icon or the user who logs in according to the communication with a card, and executing the login processing.

When a user who has registered the user information including authentication information such as a login ID and a password performs the user registration as the user who selects the user icon to log in or the user who logs in according to the communication with a card, the user registration may not be executed in a duplicated manner because the user information has already been registered. In this case, it is necessary to delete the user information including the authentication information such as the login and the password, and then perform the user registration as the user who logs in by selecting the user icon or the user who logs in according to the communication with a card. For this reason, the user registration is troublesome.

Therefore, a main object of the present invention is to provide a novel information processing apparatus, a recording medium storing a user management program, and a user management method.

Another object of the present invention is to provide an information processing apparatus, a recording medium storing a user management program, and a user management method capable of appropriately managing user information and reducing time and effort for user registration.

SUMMARY OF THE INVENTION

The first invention is an information processing apparatus, including, a first storage that stores first user information of a first user who performs user authentication by using a login name and a password, which are input, a registerer that registers second user information of a second user who performs user authentication by operating an operation item displayed on a display, the second user information including a portion overlapping with the first user information, a first determinator that determines whether the first login name included in the first user information matches the second login name included in the second user information when the second user information is registered by the registerer, and a first selector that allows a user to select whether to associate the second user of the second user information including the second login name with the first user of the first user information including the first login name when determined by the first determinator that the first login name matches the second login name, wherein when the first selector selects to associate the second user with the first user, the registerer sets at least the second login name included in the second user information of the second user to the first login name included in the first user information of the first user, and registers the second user information.

The second invention is dependent on the first invention, each of the first user information and the second user information includes user identification information for individually identifying a user, and when the first selector selected not to associate the second user with the first user, the registerer adds user another identification information different from the user identification information of the first user information of the first user to the second user information of the second user and registers.

The third invention is dependent on the second invention, wherein the second user information comprises first management information corresponding to the first user information and second management information different from the first management information, the information processing apparatus further comprises a second selector that allows the user to select whether to overwrite the first user information with the first management information when the first selector selects to associate the second user with the first user, and the registerer registers the second user information according to the selection result of the second selector.

The fourth invention is dependent on the third invention, the first management information is stored in a first memory, and the second management information is stored in a second memory that is different from the first memory, the information processing apparatus further comprises a deleter that deletes the second management information of the second user according to the operation of the user, and when the deleter deletes the second user management information, the deleter deletes the first management information including the same user identification information as the second user management information, and does not delete the first management information including the user identification information different from the second user management information.

The fifth invention is dependent on the fourth invention, when a user password is attached to the second user information, the deleter deletes the second user management information at least on condition that the user password is input, and when the user password is not attached to the second user information, the deleter unconditionally deletes the second user management information.

The sixth invention is a recording medium storing a user management program executed by an information processing apparatus including a first storage that stores first user information of a first user who performs user authentication by using a login name and a password, which are input, the user management program causing a processor in the information processing apparatus to execute registration processing that registers second user information of a second user who performs user authentication by operating an operation item displayed on a display, the second user information including a portion overlapping with the first user information, first determination processing that determines whether the first login name included in the first user information matches the second login name included in the second user information when the second user information is registered in the registration processing, and first selection processing that allows a user to select whether to associate the second user of the second user information including the second login name with the first user of the first user information including the first login name when determined that the first login name matches the second login name in the first determination processing, wherein when selected to associate the second user with the first user in the first selection processing, the registration processing sets at least the second login name included in the second user information of the second user to the first login name included in the first user information of the first user, and registers the second user information.

The seventh invention is a user management method in an information processing apparatus including a first storage that stores first user information of a first user who performs user authentication by using a login name and password, which are input, the method including (a) registering second user information of a second user wuho performs user authentication by operating an operation item displayed on a display, the second user information including a portion overlapping with the first user information, (h) determining whether the first login name included in the first user information matches the second login name included in the second user information when the second user information is registered, and (c) allowing a user to select whether to associate the second user of the second user information including the second login name with the first user of the first user information including the first login name when determined that the first login name matches the second login name, wherein when selected to associate the second user with the first user, at least the second login name included in the second user information of the second user is set to the first login name included in the first user information of the first user and registers the second user information.

According to the invention, it is possible to appropriately manage the user information and reduce the time and effort for the user registration.

DESCRIPTION OF THE PREFERRED EMBODIMENTS

Figure 1:
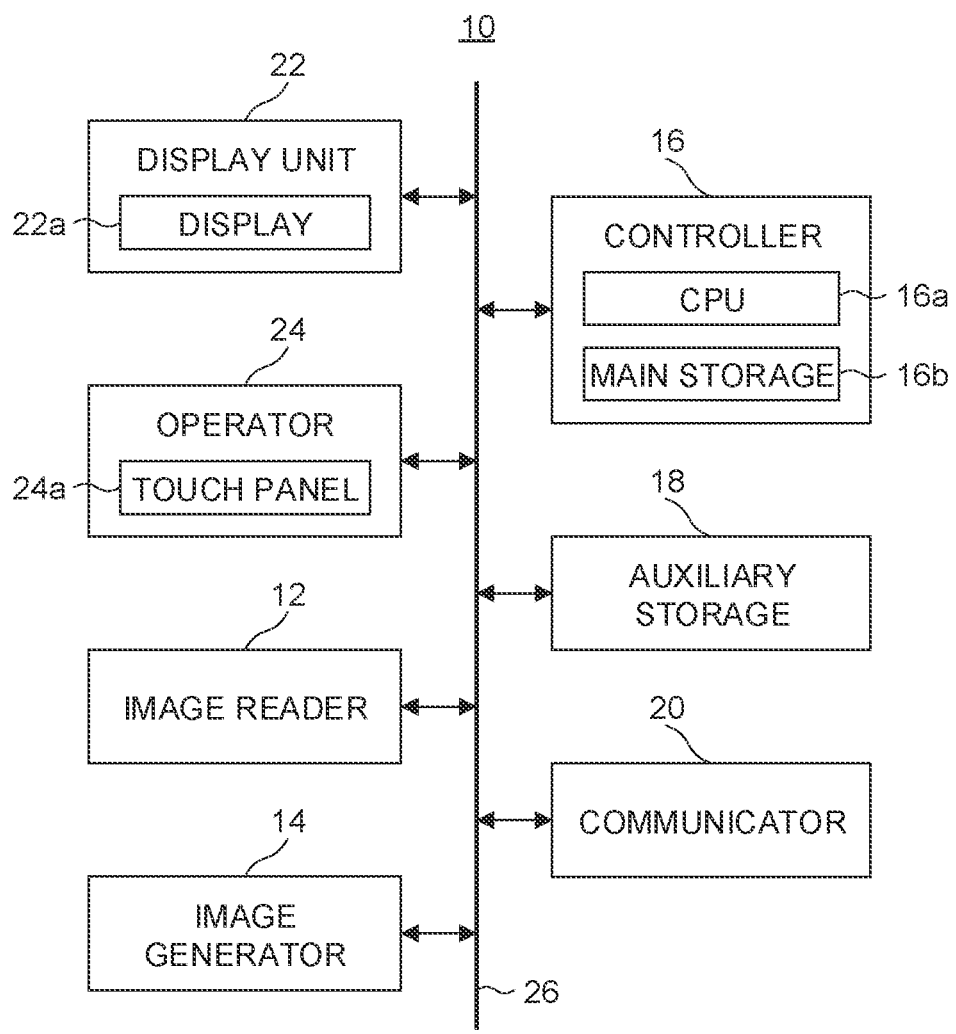
FIG. 1 is a block diagram illustrating an electrical configuration of a multifunction peripheral according to an embodiment of the present invention.
Figure 2:
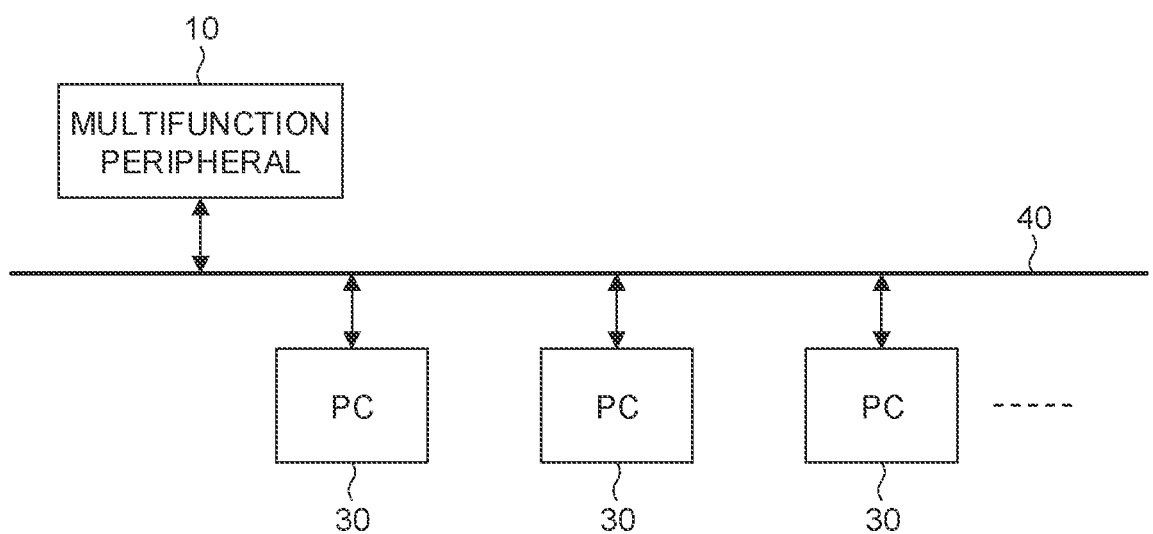
FIG. 2 is a diagram illustrating an example of a configuration in which the multifunction peripheral according to the present embodiment is connected to a personal computer (PC).

An embodiment of the present invention will be described with reference to a multifunction peripheral 10 illustrated in FIG. 1 as an example. The multifunction peripheral 10 according to the present embodiment includes a plurality of functions such as a copy function, a printer function, an image scanner function, and a facsimile function. The multifunction peripheral 10 is installed in an office, for example. In this case, a person who mainly works in the office becomes a user who uses the multifunction peripheral 10. In addition, the user of the multifunction peripheral 10 includes an administrator who has the authority to manage the multifunction peripheral 10. Further, in the office, the multifunction peripheral 10 and one or more personal computers (PC) 30 as user devices may be connected to one another via a network 40, as illustrated in FIG. 2, The network 40 is, for example, a local area network (LAN), but is not limited thereto, Various external devices such as a router and a server may be connected to the network 40, in addition to the PC 30, although the illustration is omitted. Further, the multifunction peripheral 10 may be connected to a public telephone line.

Referring again to FIG. 1, the multifunction peripheral 10 includes an image reader 12, an image generator 14, a controller 16, an auxiliary storage 18, a communicator 20, a display unit 22, and an operator 24. These are connected to one another via a common bus 26.

The image reader 12 is an example of image reading means. That is, the image reader 12 executes image reading processing of reading an image of a document not illustrated, and outputting two-dimensional image data corresponding to the image of the document. The image reader 12 includes a document placing table, not illustrated, on which a document is placed. The image reader 12 includes an image reading unit including a light source, a plurality of mirrors, an image forming lens, a line sensor, and the like, which are not illustrated. The image reader 12 includes a drive mechanism not illustrated for moving the image reading unit, and the like. The image reader 12 may include an auto document feeder (ADF) not illustrated. The image reader 12 is configured to realize, inter alia, a copy function, an image scanner function, and a facsimile function (facsimile transmission function).

The image generator 14 is an example of image forming means. That is, the image generator 14 executes image forming processing for forming an image on a sheet-like image recording medium, such as a sheet not illustrated, by a known electrophotographic method. The image generator 14 includes a photosensitive drum, a charging device, an exposure device, a developing device, a transfer device, a fixing device, and the like, which are not illustrated. The sheet on which the image is formed using the image forming processing by the image generator 14, that is, the printed matter is discharged to a discharge tray not illustrated. The image generator 14 may be capable of executing not only monochrome image forming processing but also color image forming processing. The image generator 14 is not limited to the electrophotographic system, and may employ, for example, an inkjet system. The image generator 14 is configured to realize, inter alia, a copy function, a printer function, and a facsimile function (facsimile reception function).

The controller 16 is an example of control means that governs the entire control of the multifunction peripheral 10. Therefore, the controller 16 has a central processing unit ((PU) 16a as control execution means. The controller 16 includes a main storage 16b as main storage means that can be directly accessed by the CPU 16a. The main storage 16b includes a read only memory (ROM), a random access memory (RAM), and a rewritable nonvolatile memory such as an electrically erasable programmable read-only memory (EEPROM) or a flash memory, which are not illustrated. The ROM stores a control program (firmware) for controlling the operation of the CPU 16a. The RAM constitutes a work area and a buffer area when the CPU 16a executes the processing based on the control program. The rewritable nonvolatile memory stores data that may be rewritten such as first management information 400, which will be described later.

The auxiliary storage 18 is an example of auxiliary storage means, and includes, for example, a hard disk, not illustrated. The auxiliary storage 18 may include a rewritable nonvolatile memory that is different from the nonvolatile memory in the main storage 16b. The auxiliary storage 18 stores, as necessary, various data such as image data output from second management information 450 or the image reader 12 described later, and data received via the communicator 20 described below.

The communicator 20 is an example of communication means for executing bidirectional communication processing via the network 40 by connecting to the network 40, that is, the communication processing with each external device including each of the PCs 30. The communicator 20 may be connected to the network 40 in a wired or wireless manner. The communicator 20 is connected to the public telephone line described above, and thus also executes bidirectional communication processing through the public telephone line. The communicator 20 is configured to realize, inter alia, a printer function, an image scanner function, and a facsimile function. The image scanner function has functions of transmitting image data output from the image reader 12 to an external device such as a server, and transmitting the image data by electronic mail (hereinafter referred to as "email"), as an extension function. The communicator 20 is configured to realize the extension function.

The display unit 22 includes a display 22a as an example of display means. The display 22a is, for example, a liquid crystal display (LCD), but is not limited thereto, and may be an organic electroluminescence (EL) display, or the like. The display unit 22 includes, in addition to the display 22a, an appropriate light-emitting element such as a light-emitting diode (LED) not illustrated.

The operator 24 is an example of operation receiving means that receives an operation by a user, and includes, inter alia, a sheet-like touch panel 24a. The touch panel 24a is provided on the display surface of the display 22a so as to overlap with the display 22a. The touch panel 24a is, for example, an electrostatic capacitance type touch panel. However, the touch panel 24a is not limited thereto, and may be a touch panel of another type such as an electromagnetic induction type, a resistance film type, and an infrared type. The operator 24 includes an appropriate hardware switch such as a push-button switch, not illustrated, in addition to the touch panel 24a.

The multifunction peripheral 10 described above executes user authentication in order to ensure security when the multifunction peripheral 10 is used. In general, when the user authentication is executed, a login screen not illustrated for entering input information such as a login ID (or a login name) and a password (hereinafter, referred to as a "normal login screen") is displayed on the display 22a. A user inputs a login name and a password on the normal login screen, and then operates a login button (or an OK button, for example, also referred to as "press" or "tap". The same applies hereinafter).

The multifunction peripheral 10 determines whether the login ID and the password registered in advance match the login ID and the password input by the user on the normal login screen. When the login ID and the password input by the user match the login name and the password registered in advance, the authentication is OK, and the user logs in to the multifunction peripheral 10. On the other hand, when at least one of the login name and the password input by the user does not match the login name and the password registered in advance, the authentication is unsuccessful, and the user cannot log in to the multifunction peripheral 10. Hereinafter, the case in which the login is performed using the normal login screen may be referred to as a "normal login mode". The logged-in user can use the multifunction peripheral 10 within the range of the preset restriction on use. As an example, the restriction on use is the limitation of the number of copies or prints.

The user, who logs in in the normal login mode, is registered in the multifunction peripheral 10 by the administrator in the system setting, Here, the system setting refers to a mode for setting information that basically does not needs to be changed when being set once, unlike information that can be set for each job, such as execution conditions of a job such as printing, copying, faxing, and scanning. For example, the system setting may set and change the array of icons on the home screen, the standard value of the frame erase width in the copy function, the standard setting of the color mode in the scan function (for example, black and white, gray scale, and full color), and the like, other than registering, editing, and deleting the user who logs in in the normal login mode.

Figure 3:
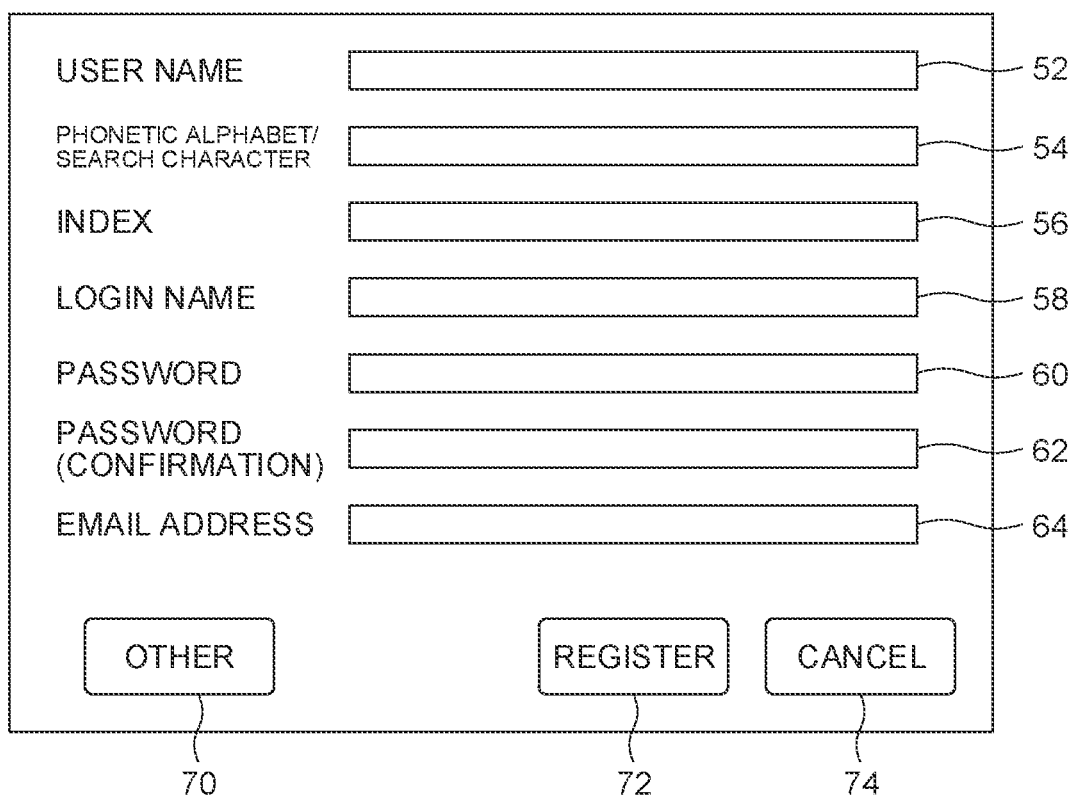
FIG. 3 is a diagram illustrating an example of a normal login user registration screen.

FIG. 3 illustrates an example of a registration screen 50 for registering a user who logs in in the normal login mode (hereinafter referred to as a "normal login user registration screen"). In the system setting, the normal login user registration screen 50 is displayed on the display 22a in response to the administrator selecting the user registration.

As illustrated in FIG. 3, a plurality of fields, for example, seven fields 52, 54, 56, 58, 60, 62 and 64 are arranged in a vertical column on the normal login user registration screen 50. Below the field 64, a button 70 for displaying a field related to another item, a button 72 for executing the user registration, and a button 74 for canceling the user registration are arranged.

The uppermost field 52 is a field for entering the name of the user who registers as a user who can use the multifunction peripheral 10, that is the user name. The user name cannot be registered redundantly with another user. The second field 54 is a field for entering a phonetic alphabet of the user name of the user or a search character. The third field 56 is a field for entering the index of the user. The fourth field 58 is a field for entering a login name. The login name cannot be registered with another user in a duplicated manner. The fifth field 60 is a field for entering a password. The sixth field 62 is a field for re-entering the password in order to confirm the password entered in the fifth field 60. The bottom field 64 is a field for entering an email address.

When the other button 70 is operated, a plurality of fields for entering a plurality of other items are displayed, instead of the fields 52 to 64. An example of the other items is the name of each group of the number-of-used-sheets restriction group and the authority group.

Although the detailed description is omitted, the phonetic alphabet or search character is a search character for determining the display order when displaying user names in a list. The index is an index for a user who registers, and is shared with an index used in an address book registered in the multifunction peripheral 10. The login name is a login ID to be used for user authentication. The password is a password used for user authentication.

The number-of-used-sheets restriction group is a group name of a previously-registered number-of-used-sheets restriction group, and is input in accordance with the number of used sheets restriction of a user. The authority group is a group name of a pre-registered authority group, and is input in accordance with the authority of the user.

In the normal login user registration screen 50, the user name in the field 52, the phonetic alphabet or the search character in the field 54, and the index in the field 56 are mandatory among the fields 52, 54, 56, 58, 60, 62 and 64. The input to the fields 58, 60, 62 and 64 other than the above, that is, the input of the login name, the password, and the email address, is not mandatory, and is optional. When no login name is input, for example, a copy of the user name is registered as the login name. A software keyboard not illustrated is displayed when entering into the fields 52 to 64 and the fields for the other items.

On the normal login user registration screen 50, when the registration button 72 is operated in the case that at least the user name, the phonetic alphabet or the search character, and the index are input, the contents of each item including the user name, the phonetic alphabet or the search character, and the index are registered as information for the user (hereinafter referred to as "user information"). According to the present embodiment, the user information of the user who logs in in the normal login mode is stored in the auxiliary storage 18 (the HDD in the present embodiment). Then, the normal login user registration screen 50 is closed.

The user information (hereinafter referred to as "normal user information" for convenience of description) includes the content input on the login user registration screen 50 as described above, and the user ID is given as the unique identification information for identifying each of the users. According to the present embodiment, the user ID is a serial number. Note that the fact that the user ID is the serial number is an example, and the user ID may be a character strings using an alphabet, or an alphabet and a number. That is, the normal user information includes information such as a user ID, a user name, a phonetic alphabet/search character, an index, a login name, a password, and an email address. Note that, in the item that has not been input on the login user registration screen 50, information indicating that there is no information for the item (for example, null) is described.

When the cancel button 74 is operated on the normal login user registration screen 50, the user registration in the normal login mode is canceled, and then the normal login user registration screen 50 is closed, regardless of whether or not the fields 52 to 64 are input. In this case, the user information is not stored in the auxiliary storage 18.

The administrator can log in as the administrator by entering the login ID and the administrator password for the administrator on the login screen in the normal login mode described above. The administrator who has logged in as the administrator can use all the functions of the multifunction peripheral 10 including the detailed setting of the multifunction peripheral 10.

The administrator password is memorized (stored) in advance in the above-described rewritable nonvolatile memory constituting the main storage 16b, for example. The administrator password can be arbitrarily changed by the administrator.

Further, the administrator can remotely log in the multifunction peripheral 10, for example, by using her or his own computer, and register a user who logs in in the normal login mode, in the system setting.

As described above, when a user logs in in the normal login mode, the user needs to input her/his login ID and password as the authentication information of the user authentication. In order to reduce the time and effort of the operation for the user authentication, the multifunction peripheral 10 has an operation mode called a quick login mode. The quick login mode is an operation mode in which simple authentication is executed by selecting a user icon to log in to the multifunction peripheral 10.

Figure 4:
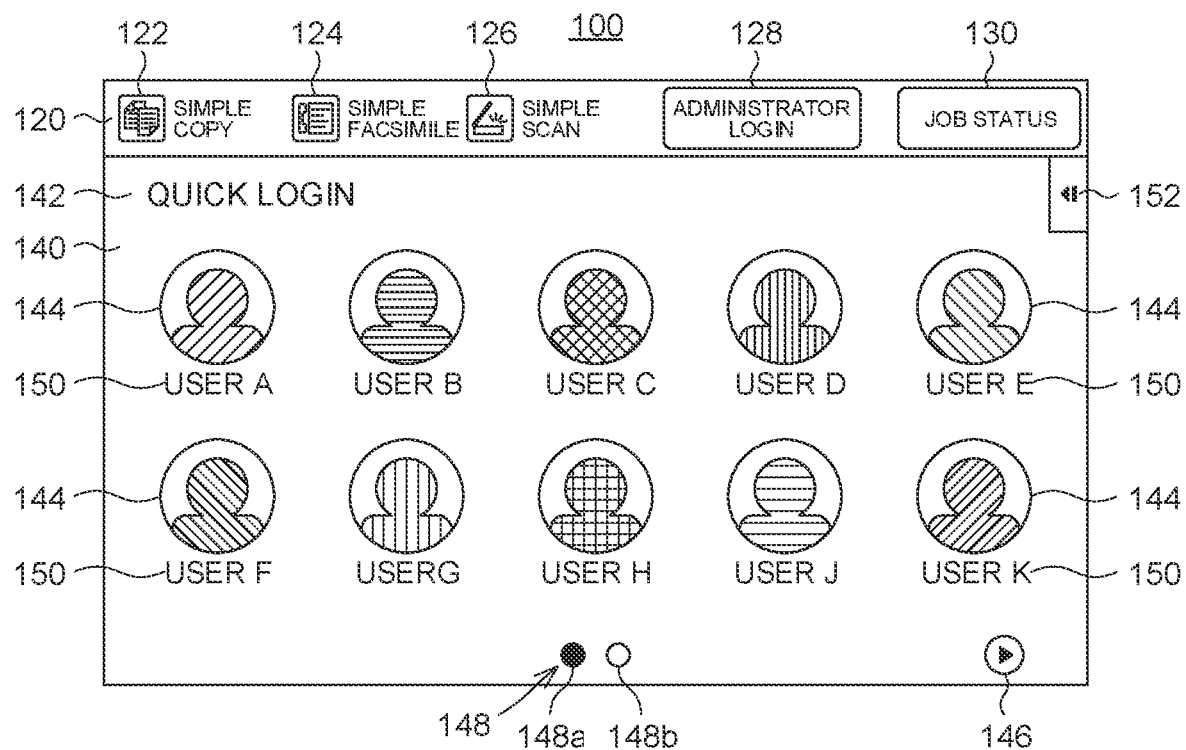
FIG. 4 is a diagram illustrating an example of a quick login screen.

In the quick login mode, that is, when the function of the quick login is valid, a quick login screen 100 as illustrated in FIG. 4 is displayed on the display 22a as the basic screen (or home screen) of the quick login, for example.

Note that whether to enable or disable the function of the quick login can be set by the system setting. When the function of the quick login is disabled, the quick login screen 100 is not displayed. In this case, the normal login screen is displayed.

As illustrated in FIG. 4, the quick login screen 100 includes a belt-like display area 120 and a main display area 140. The belt-like display area 120 is a horizontally long belt-like area that occupies an upper portion of the quick login screen 100. In the belt-like display area 120, for example, a copy selection button (strictly, a diagram imitating a button) 122 for selecting a copy function, a facsimile selection button 124 for selecting a facsimile function, and an image scanner selection button 126 for selecting an image scanner function are arranged. In addition, in the belt-like display area 120, an administrator login button 128 for an administrator to log in, and a job status confirmation button 130 for confirming the status of the job are arranged.

Although the illustration is omitted, when the job status confirmation button 130 is operated, a screen for confirming the job status is displayed on the display 22a. In the screen for confirming the job status, the current status of the job being currently executed (for example, a print job, a fax job, and a scan job) is displayed in text. When no job is executed, nothing is displayed on the screen for confirming the job status.

On the other hand, the main display area 140 is an area other than the belt-like display area 120 in the quick login screen 100, that is, a rectangular area that occupies most of the quick login screen 100. In the upper left portion of the main display area 140, an appropriate character string 142 representing the title of the quick login screen 100 is arranged. Below the character string 142, a user icon 144 as an operation item associated with each user is arranged in a wide range including the central portion of the main display area 140. FIG. 3 illustrates an example in which ten user icons 144, 144, . . . corresponding to ten users are arranged in an array of five in the horizontal direction and two in the vertical direction.

A page switch button 146 for switching the display content in the main display area 140, that is, for switching pages, is arranged on the lower right portion of the main display area 140, for example. A page indicator 148 is disposed on the lower center portion of the main display area 140. The page indicator 148 is an indicator that represents the page being displayed in the main display area 140, and includes, for example, two circular lamps (strictly, lamp-like patterns) 148a and 148b arranged side by side. The lamp 148a of the lamps 148a and 148b corresponds to the first page, and the other lamp 148b corresponds to the second page. FIG. 4 illustrates an example in which the first page is being displayed, that is, an example in which the lamp 148a corresponding to the first page is being lit.

When the number of users is ten or less, strictly speaking, when the number of user information registered according to the procedure described below (hereinafter referred to as "quick user information" for convenience of description) is ten or less, the page switch button 146 and the page indicator 148 (two lamps 148a and 148b) are not displayed. According to the present embodiment, it is possible to register the quick user information for up to 20 people. Instead of the page switch button 146 and the page indicator 148, for example, a known scroll bar may be provided, so that all of the user icons 144, 144, . . . are sequentially displayed. Instead of the page switching or scrolling, all of the user icons 144, 144, . . . may be displayed at once. The display method and the layout of these user icons 144, 144, . . . , the maximum registration number of the quick user information, and the like are not limited to the content described here.

A character string 150 representing a login name, which is a username corresponding to each user icon 144, is arranged below each user icon 144. A tab 152 for opening and closing an action panel 154, which will be described later, is disposed in the upper right portion of the main display area 140.

In the quick login screen 100, the user can simply receive the user authentication (hereinafter referred to as "simple authentication"), that is, log in, by operating the user icon 144 corresponding to the user. According to the simple authentication (or also referred to as "quick authentication"), it is possible to reduce the time and effort required for the user authentication as described above. However, the simple authentication cannot secure the security. The user who desires to secure the security can set an arbitrary password as a user password, as will be described later. When the user, who has set the password, operates the user icon 144 corresponding thereto, a password input screen not illustrated is displayed in response to the operation, and the user can log in by entering the password on the password input screen.

Alternatively, when the administrator mentioned above operates the administrator login button 128, an administrator login screen not illustrated is displayed in response to the operation, and the administrator can log in as the administrator by entering predetermined information including the administrator password on the administrator login screen. The administrator who has logged in as the administrator can use all the functions of the multifunction peripheral 10 including the detailed setting of the multifunction peripheral 10, unlike the general user who logs in by operating the user icon 144.

The quick login screen 100 is displayed based on the quick user information registered in advance. The registration of the quick user information, that is, the user registration of the user who logs in in the quick login mode (that is, registration of a new user) is executed in the following manner.

Figure 5:
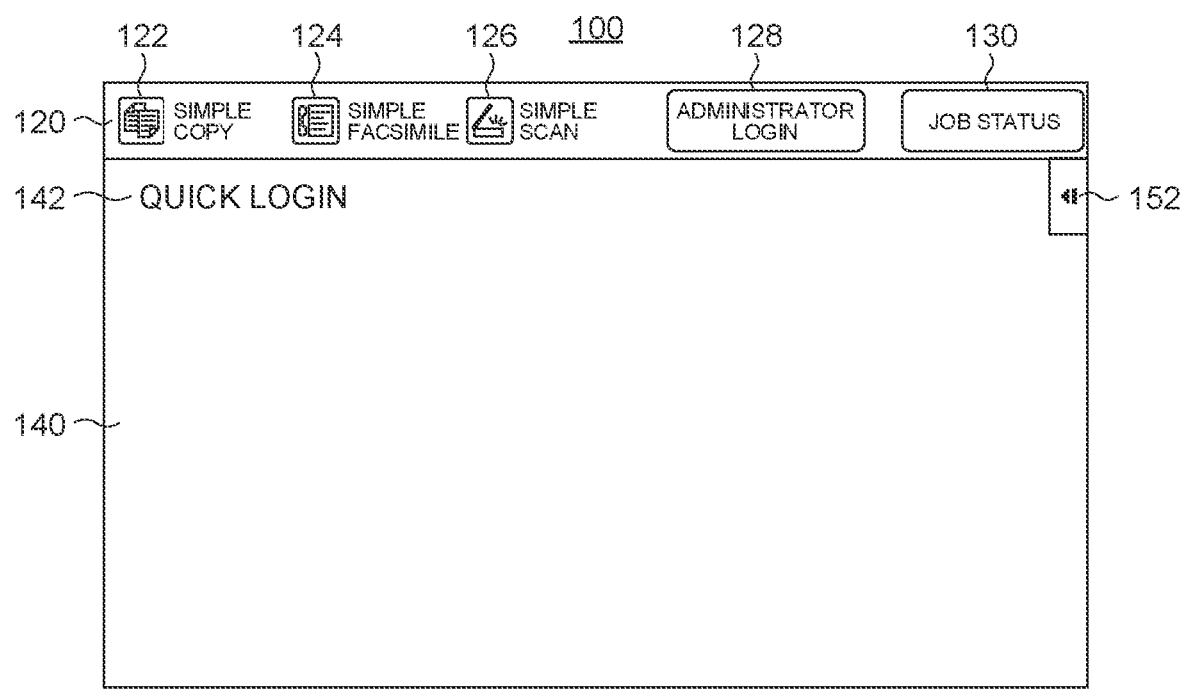
FIG. 5 is a diagram illustrating an example of the quick login screen when no user is registered.

When no quick user information is registered, in other words, when the user registration is about to be executed for the first time, the quick login screen 100 as illustrated in FIG. 5 is displayed. On the quick login screen 100 when no user is registered, the user icon 144 and the character string 150 representing the login name are not displayed. Further, the page switch button 146 and the page indicator 148 are not displayed.

Figure 6:
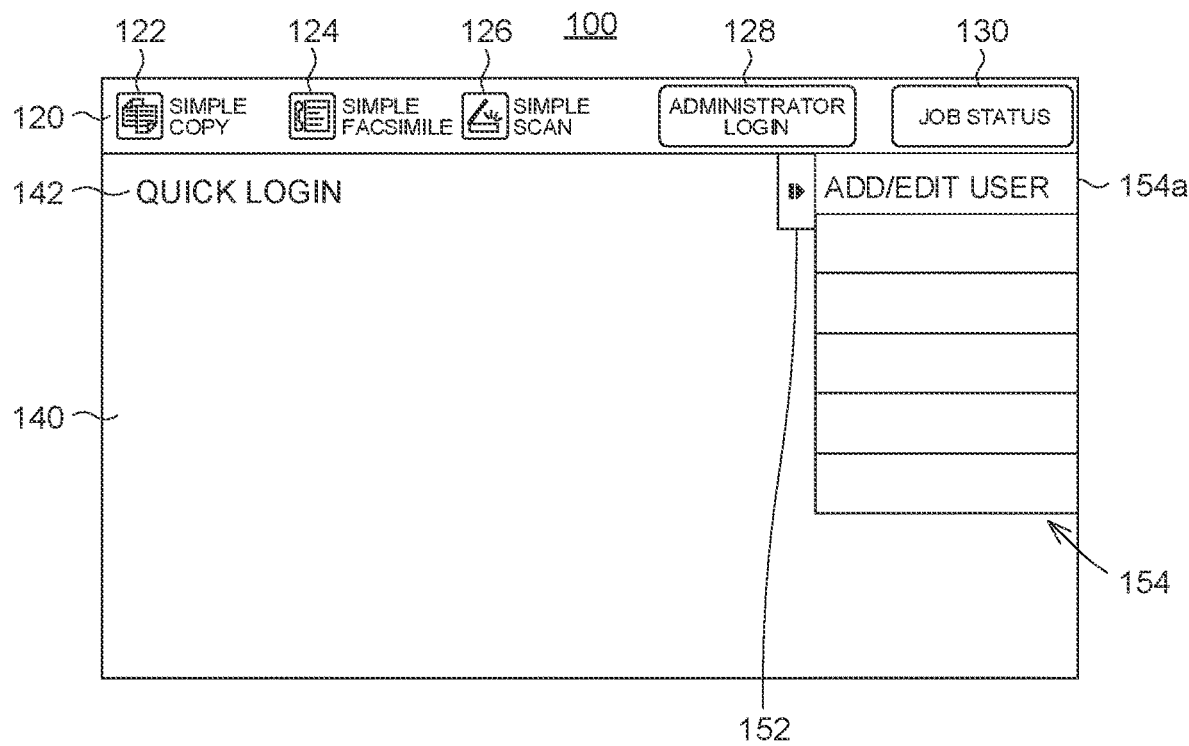
FIG. 6 is a diagram illustrating an example of another state of the quick login screen when no user is registered.

When the tab 152 is operated on the quick login screen 100 when no user is registered, the quick login screen 100 transitions to the state illustrated in FIG. 6. That is, the action panel 154 is displayed so as to cover a portion of the right side portion of the main display area 140. The action panel 154 includes a user add/edit button 154a for displaying a user add/edit screen 200 described below.

Figure 7:
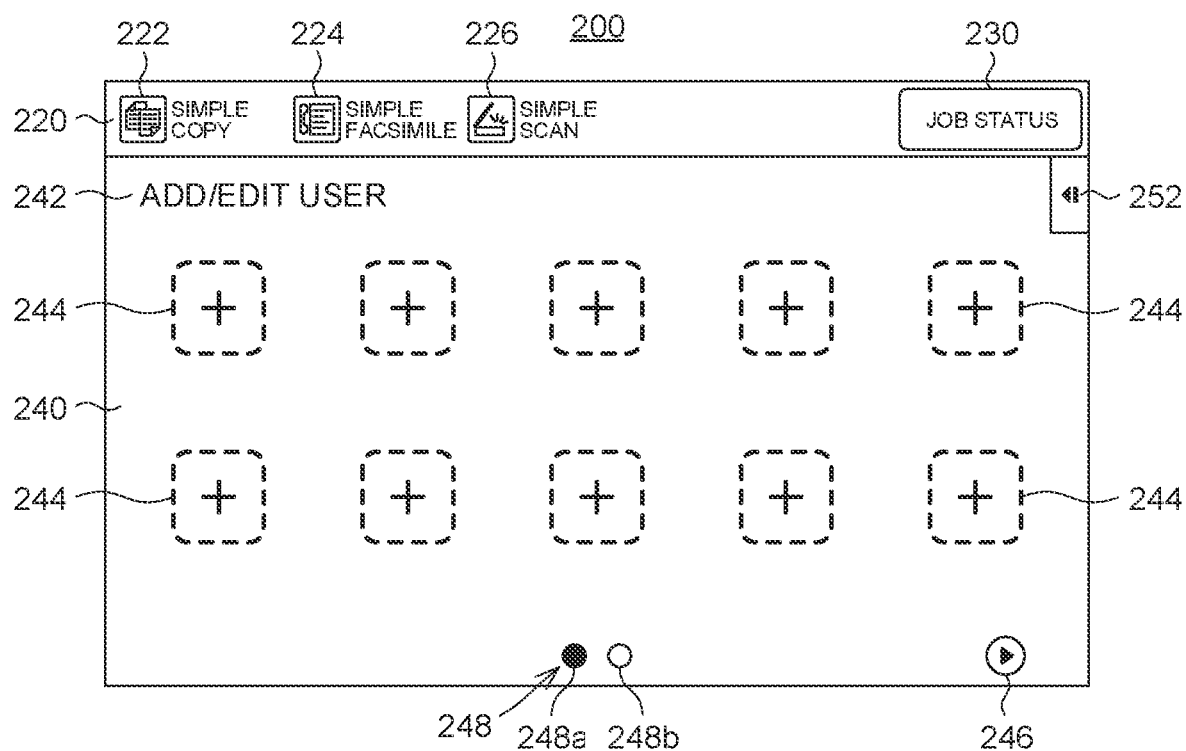
FIG. 7 is a diagram illustrating an example of a user add/edit screen when no user is registered.

On the quick login screen 100 illustrated in FIG. 6, when the user add/edit button 154a in the action panel 154 is operated, instead of the quick login screen 100, the user add/edit screen 200 illustrated in FIG. 7 is displayed on the display 22a. The user add/edit screen 200 also includes a belt-like display area 220 and a main display area 240, similarly to the quick login screen 100.

In the belt-like display area 220 on the user add/edit screen 200, a copy selection button 222, a facsimile selection button 224, and an image scanner selection button 226, which are similar to those on the quick login screen 100, are arranged. In addition, a job status confirmation button 230 similar to that on the quick login screen 100 is arranged in the belt-like display area 220. The belt-like display area 220 does not have an administrator login button, unlike the quick login screen 100. That is, the administrator logs in as the administrator by operating the administrator login button 128 on the quick login screen 100, and subsequently proceeds to the user add/edit screen 200 by operating the user add/edit button 154a on the quick login screen 100.

On the other hand, in the upper left portion of the main display area 240 on the user add/edit screen 200, an appropriate character string 242 representing the title of the user add/edit screen 200 is arranged. Then, in a wide range below the character string 242 and including the central portion of the main display area 240, ten unregistered icons 244, 244, . . . , with an appropriate symbol, for example, a symbol including a "+" mark, are arranged in an arrangement of five in the horizontal direction and two in the vertical direction. The number and arrangement of the unregistered icons 244 follow the number and arrangement of the user icons 144 on the quick login screen 100 illustrated in FIG. 4. However, the number and arrangement of the unregistered icons 244 is not limited to the number and arrangement.

In the lower right portion of the main display area 240, a page switch button 246 similar to that on the quick login screen 100 is arranged. In the lower center portion of the main display area 240, a page indicator 248 similar to that on the quick login screen 100 is arranged, that is, two circular lamps 248a and 248b are arranged side by side. Immediately after transitioning from the quick login screen 100 to the user acid/edit screen 200, the first page in the main display area 240 is displayed, that is, the lamp 248a corresponding to the first page is turned on. In the upper right portion of the main display area 240, a tab 252 similar to that on the quick login screen 100 is arranged.

Figure 8:
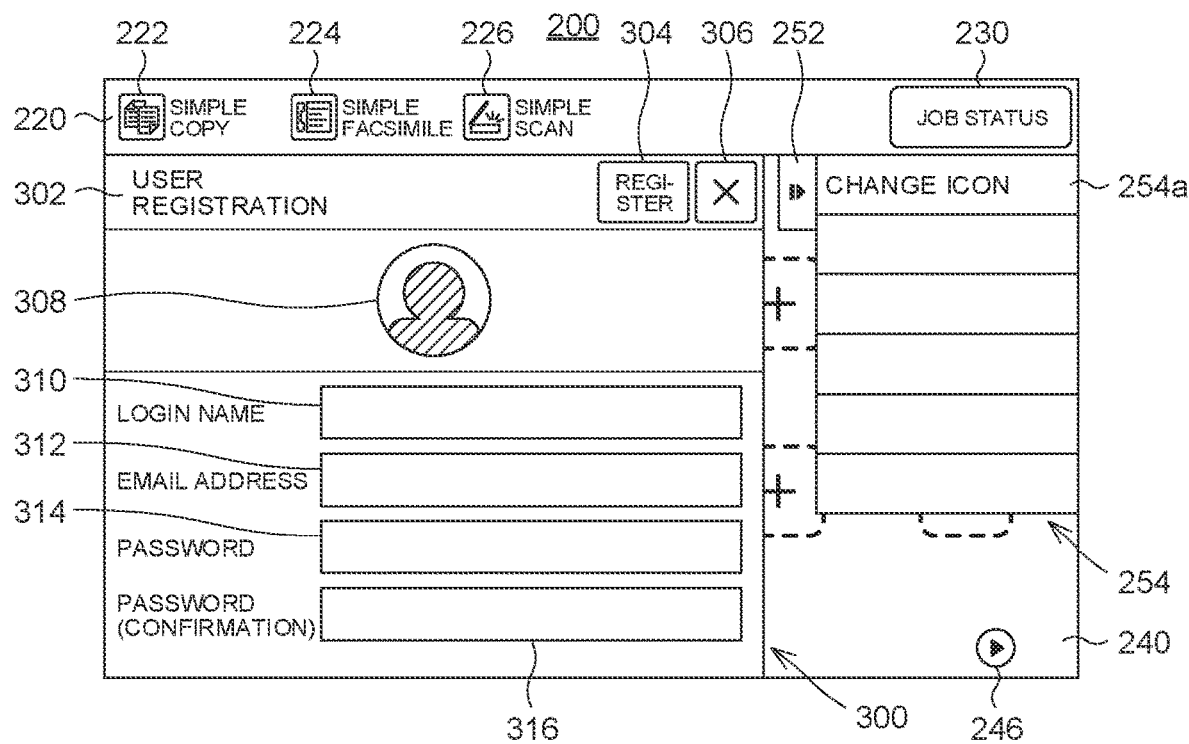
FIG. 8 is a diagram illustrating an example of the user add/edit screen in the state where a user registration screen for new registration is displayed.

On the user add/edit screen 200 when no user is registered, which is illustrated in FIG. 7, when an arbitrary unregistered icon 244 is operated, the user add/edit screen 200 transitions to the state illustrated in FIG. 8. That is, a small screen called a user registration screen 300 for new generation is displayed so as to cover a portion of the main display area 240 from the left side portion to the substantially central portion.

In the upper left portion of the user registration screen 300 for new registration, an appropriate character string 302 representing the title of the user registration screen 300 is arranged. In the upper tight portion of the user registration screen 300 for new registration, a registration button 304 for registering the quick user information by using the content input on the user registration screen 300, and a close button 306 for closing the user registration screen 300 ("×" is marked) are arranged side by side. An icon image 308, which is a so-called original diagram of the user icon 144, is disposed below these buttons. Below the icon image 308, a plurality of fields, for example, four fields 310, 312, 314 and 316 are arranged in a vertical column. The uppermost field 310 is a field for entering a login name of a user to be registered from now. The second field 312 is a field for entering the email address of the user. The third field 314 is a field for entering an arbitrary password for a user to be registered from now. The bottom field 316 is a field for re-entering the password for confirmation.

When the tab 252 described above is operated, the action panel 254 is displayed. The action panel 254 includes an icon change button 254a for changing the icon image 308, that is, for changing the user icon 144.

On the user registration screen 300 for new registration illustrated in FIG. 8, for example, when the icon image 308 is operated, an icon selection screen, not illustrated, is displayed. When the icon change button 254a in the action panel 254 is also operated, the icon selection screen is displayed. The icon selection screen includes a large number of icon samples. When an arbitrary icon sample is selected (operated) on the icon selection screen, the icon image 308 corresponding to the selected icon sample is set, that is, the user icon 144 is set. Subsequently, the icon selection screen is closed.

Note that the change of the icon does not have to be limited to the selection from the icon samples, and may be executed by the user adding an arbitrary icon image.

In the uppermost field 310 of the fields 310, 312, 314 and 316, a login name is input as described above. Only entering a login name in the field 310 is mandatory. The input into the other fields 312, 314 and 316, that is, the input of the email address and the password is not mandatory but optional. When entering in these fields 310, 312, 314 and 316, a software keyboard, not illustrated, is displayed.

Figure 9:
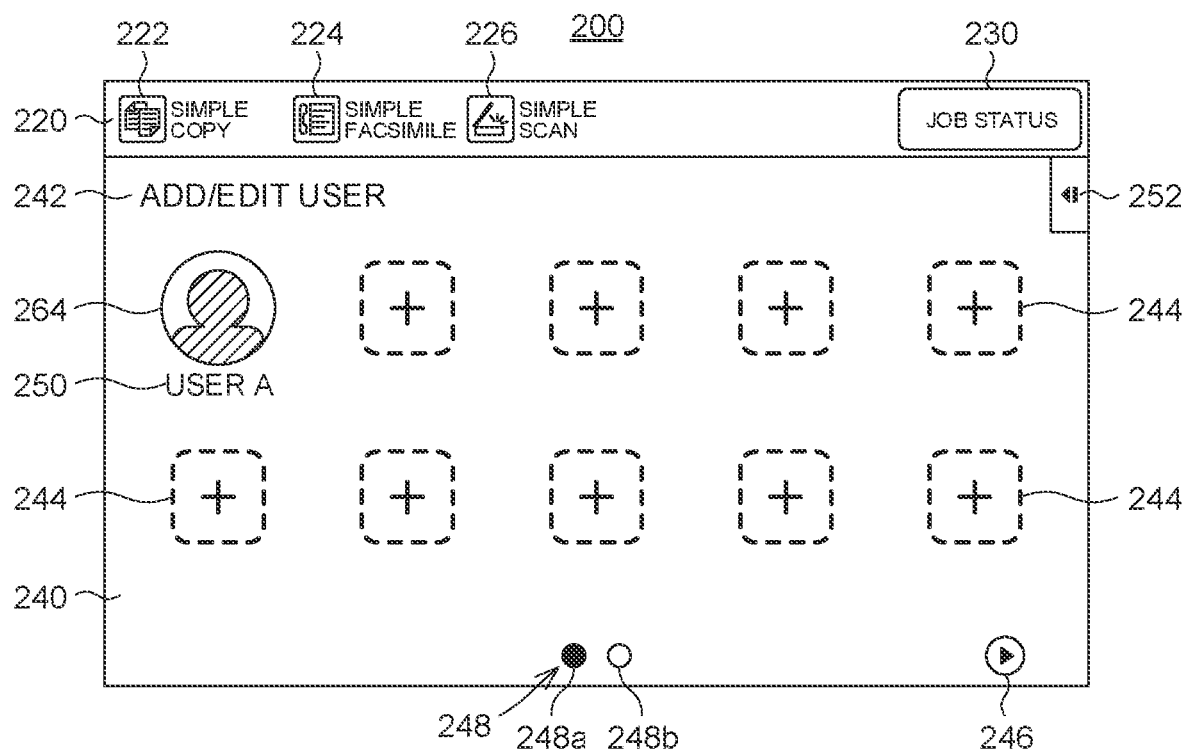
FIG. 9 is a diagram illustrating an example of the user acid/edit screen after user registration.

On the user registration screen 300 for new registration, at least in the state where the login name is entered in the uppermost field 310, when the registration button 304 is operated, information or content including the login name is registered. Subsequently, the user registration screen 300 for new registration is closed. As a result, the user add/edit screen 200 transitions to the state as illustrated in FIG. 9. In the state where no login name is entered in the uppermost field 310 on the user registration screen 300 for new registration, when the registration button 304 is operated, a small screen called an error message screen, not illustrated, is displayed for a certain period (for example, several seconds). Subsequently, the state immediately before the operation of the registration button 304 is reproduced, that is, the user registration screen 300 for new registration in the state in which no login name is entered in the uppermost field 310 is displayed again. When the close button 306 is operated on the user registration screen 300 for new registration, the user registration screen 300 is closed as it is, that is, the state immediately before the user registration screen 300 is displayed is reproduced.

In the user add/edit screen 200 illustrated in FIG. 9, the user icon 264 is arranged in place of the unregistered icon 244 that has been operated immediately before the user registration screen 300 is displayed, based on the content registered by the user registration screen 300 for new registration. FIG. 9 illustrates an example in which a newly registered user icon 264 is arranged in place of the unregistered icon 244 in the upper left corner portion of the main display area 240. A character string 250 representing the login name of the user is arranged below the user icon 264. The user icon 264 and the character string 250 on the user add/edit screen 200 correspond to the user icon 144 and the character string 150 on the quick login screen 100. That is, the user icon 264 and the character string 250 are, so to speak, the original forms of the user icon 144 and the character string 150 on the quick login screen 100. It is possible to also register another user arbitrarily in the same manner as this. For example, when more than 10 users are registered, the user add/edit screen 200 becomes in the state as illustrated in FIG. 10.

Figure 10:
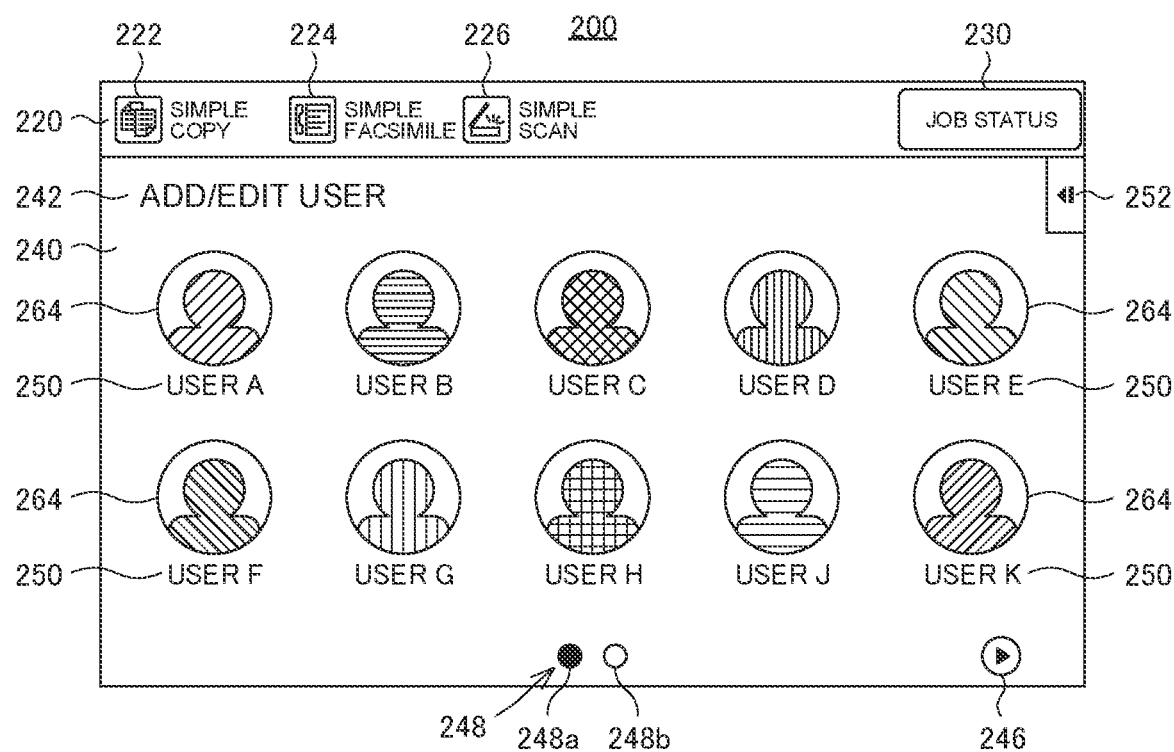
FIG. 10 is a diagram illustrating an example of another state of the user add/edit screen after user registration.

When the tab 252 is operated on the user add/edit screen 200 illustrated in FIG. 10, the action panel 254 is displayed, although the illustration is omitted. The action panel 254 includes a return button for returning to the quick login screen 100. When the return button is operated, the quick login screen 100 illustrated in FIG. 4 is displayed on the display 22a in place of the user add/edit screen 200. Similarly, on the user add/edit screen 200 when no user is registered illustrated in FIG. 7, when the tab 252 is operated, the action panel 254 including the return button is displayed. When the return button in the action panel 254 is operated, the quick login screen 100 when no user is registered, which is illustrated in FIG. 5, is displayed on the display 22a, instead of the user add/edit screen 200 illustrated in FIG. 7, The hardware switch that constitutes the operator 24 includes a home button, and the quick login screen 100 is displayed also by operating the home button, instead of the user acid/edit screen 200.

The home button does not need to be limited to a hardware switch, and may be a software button.

Figure 11:
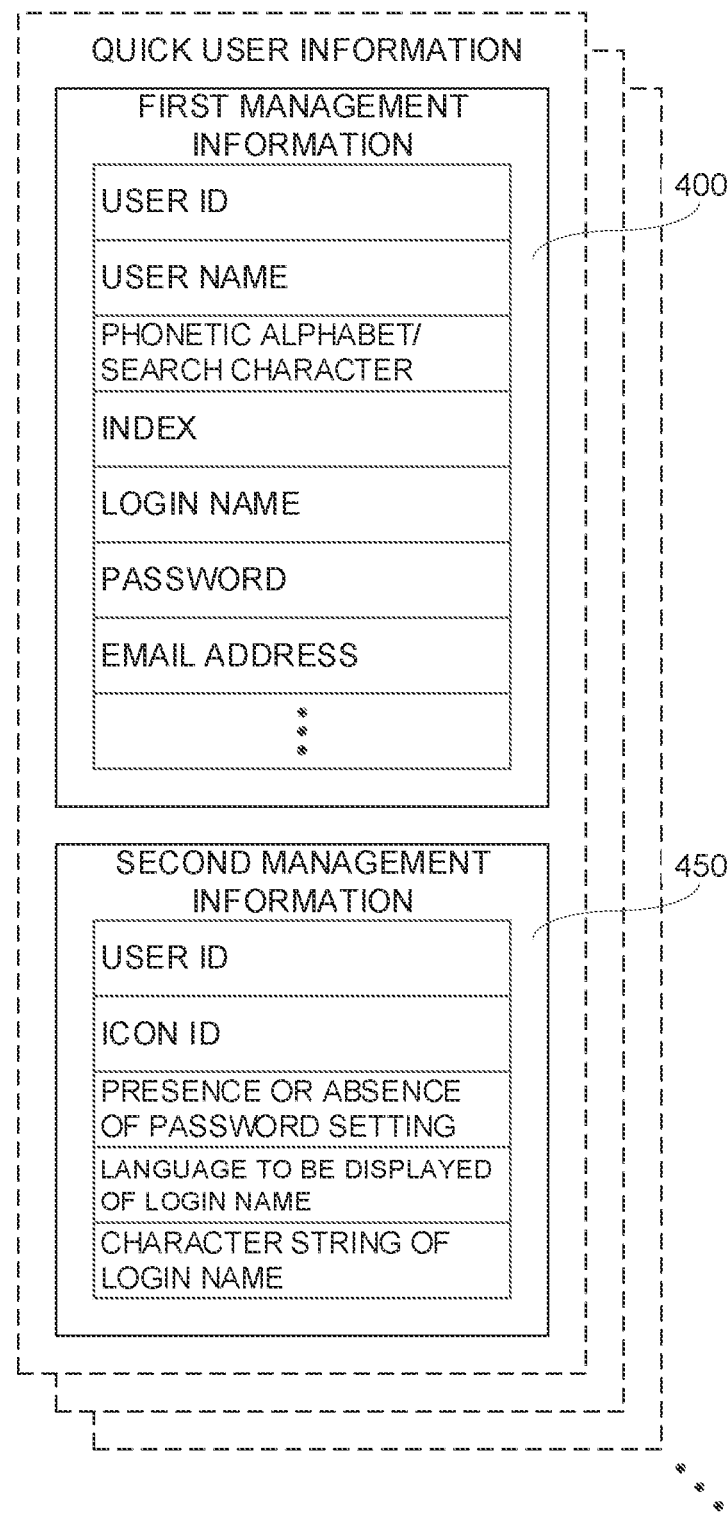
FIG. 11 is a diagram illustrating an example of quick user information.

As described above, when the user registration of a user who logs in in the quick login mode is executed, the quick user information as illustrated in FIG. 11 is recorded. The quick user information is divided into the first management information 400 and the second management information 450. The first management information 400 is stored in the auxiliary storage 18, and the second management information 450 is stored in the main storage 16b (EEPROM in the present embodiment).

The first management information 400 is the same information as the normal user information, and includes information such as a user ID, a user name, a phonetic alphabet/search character, an index, a login name, a password, and an email address, Since the individual information has been described in the above-mentioned user registration for the normal login, the duplicate description will be omitted. Note that the email address and the password are included in the first management information 400 only when the email address and the password are input on the user registration screen 300 for new registration. Further, since an item that is not provided on the user registration screen 300 for new registration are not entered, information indicating the absence of information (for example, null) about information corresponding to the item is written.

Figure 12:
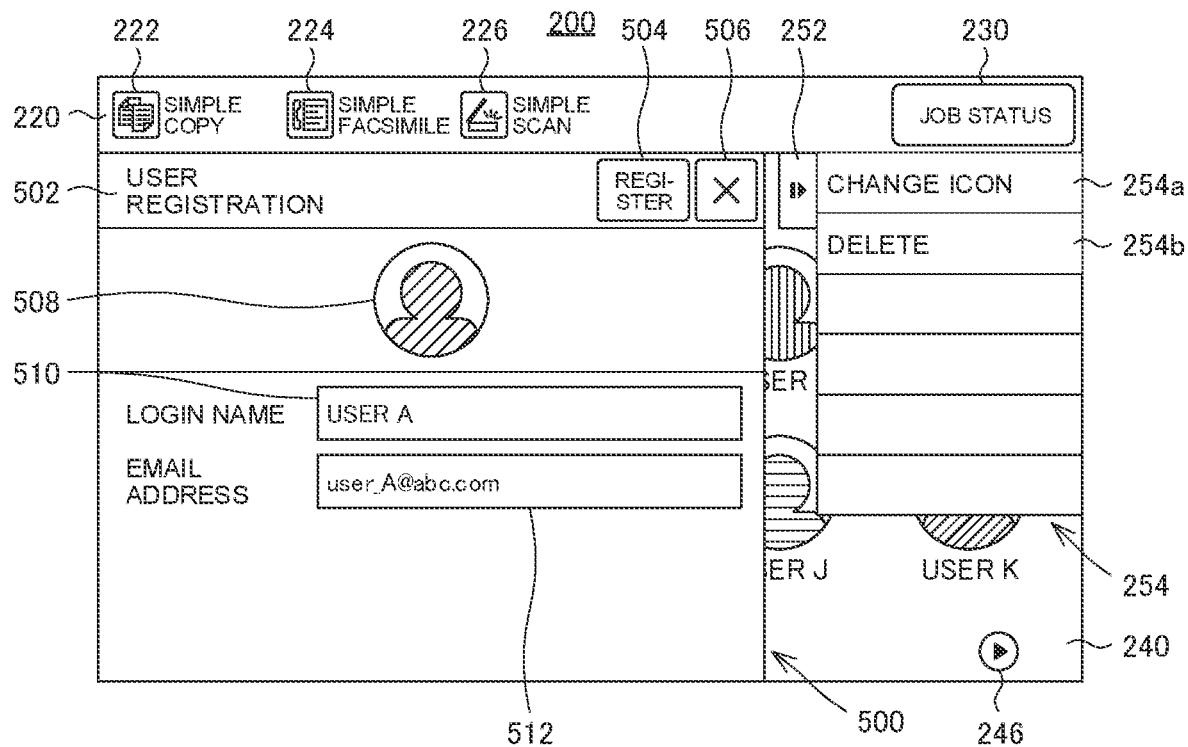
FIG. 12 is a diagram illustrating an example of the user add/edit screen in the state where a user registration screen for editing is displayed.

According to the present embodiment, it is possible to edit the registered quick user information. For example, it is assumed that an arbitrary user icon 264 is operated on the user add/edit screen 200 illustrated in FIG. 10. Further, it is assumed that no password is attached (set) to the quick user information related to the operated user icon 264. Then, the user add/edit screen 200 transitions to the state as illustrated in FIG. 12. That is, a small screen called as a user registration screen 500 for editing is displayed so as to cover a portion of the main display area 240 from the left side portion to the substantially central portion. FIG. 12 illustrates a state where the user icon 264 corresponding to "user A" is operated on the user add/edit screen 200 illustrated in FIG. 10.

In the user registration screen 500 for editing, similar to the user registration screen 300 for new registration, an appropriate character string 502 representing the title of the user registration screen 500 is arranged in the upper left portion thereof. In addition, a registration button 504 for setting the registration (editing) content on the user registration screen 500, and a close button 506 for closing the user registration screen 500 are arranged side by side in the upper right portion of the user registration screen 500 for editing. An icon image 508 is arranged below these buttons. Two fields 510 and 512 are arranged in a vertical column below the icon image 508. The upper field 510 is a field for editing the login name. The lower field 512 is a field for editing the email address.

When the tab 252 is operated, the action panel 254 is displayed. A delete button 254b is included to delete the quick user information to be edited, that is, to delete the registered user, in addition to the icon change button 254a, on the action panel 254 when the user registration screen 500 for editing is displayed.

When the icon image 508 is operated on the user registration screen 500 for editing illustrated in FIG. 12, for example, the icon selection screen described above is displayed. When the icon change button 254a in the action panel 254 is also operated, the icon selection screen is displayed. The icon image 508 can be edited (changed), that is, the user icon 144 can be edited, on the icon selection screen. The login name can be arbitrarily edited in the upper field 510, and the email address can be arbitrarily edited in the lower field 512. The software keyboard described above is displayed when the login name and the email address are edited. The password cannot be edited.

On the user registration screen 500 for editing, when appropriate editing is executed and then the registration button 504 is operated, the edited content is set. That is, the quick user information, that is, the first management information 400 and the second management information 450 are updated. Then, the user registration screen 500 for editing is closed. As a result, the user add/edit screen 200 transitions to a state based on the recorded content of the updated quick user information. Note that, for example, when the registration button 504 is operated in a state in which no login name is input in the upper field 510 on the user registration screen 500 for editing, an error message screen similar to that described above is displayed for a certain period. Subsequently, the state immediately before the registration button 504 is operated is reproduced. That is, the user registration screen 500 for editing in the state where no login name is entered in the upper field 510 is displayed again. When the close button 506 is operated on the user registration screen 500 for editing, the user registration screen 500 is closed as it is, that is, the state immediately before the user registration screen 500 is displayed is reproduced. When the delete button 254b in the action panel 254 is operated, the quick user information for the user (that is, the registered user who is the object of editing) is deleted. That is, the first management information 400 and the second management information 450 for the registered user who is the object of editing are deleted. Then, the user registration screen 500 for editing is closed. As a result, the user add/edit screen 200 transitions to a state in which the user icon 264 corresponding to the deleted quick user information is not displayed.

Figure 13:
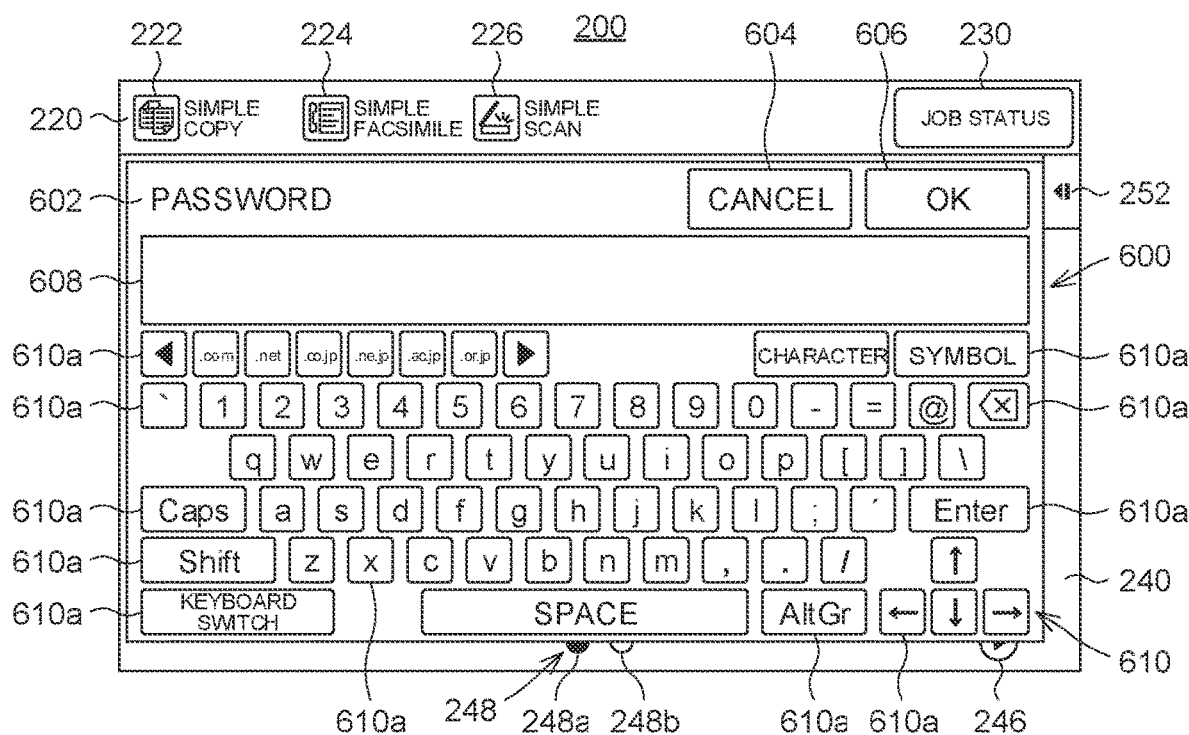
FIG. 13 is a diagram illustrating an example of the user add/edit screen in the state where a password input screen is displayed.

On the other hand, when a password is attached to the quick user information related to the user icon 264 operated on the user add/edit screen 200, the user add/edit screen 200 transitions to the state as illustrated in FIG. 13. That is, a small screen, which is a password input screen 600 slightly smaller than the main display area 240, is displayed so as to cover the main display area 240.

On the password input screen 600, an appropriate character string 602 representing the title of the password input screen 600 is arranged in the upper left portion thereof. A cancel button 604 and an OK button 606 are arranged side by side in the upper right portion of the password input screen 600. A horizontally long rectangular password display area 608 is arranged below these buttons. A software keyboard 610 is disposed below the password display area 608. The software keyboard 610 includes a plurality of appropriate operation keys 610a, 610a, . . . .

On the password input screen 600, the same password as at the time of the registration is entered by the operation of the software keyboard 610 (appropriate operation keys 610a, 610a, . . . ). The entered password is displayed in the password display area 608. Subsequently, when the OK button 606 is operated, the entered password is collated with the registered password. When both of the passwords are collated, that is, when both of the passwords match each other, the user registration screen 500 for editing described above is displayed instead of the password input screen 600. Accordingly, it is possible to edit the quick user information in the same manner as described with reference to FIG. 12. However, as described above, the password cannot be edited. When the quick user information for the registered user who is the object for editing is deleted, the user registration screen 500 for editing is further closed. As a result, the close of the user registration screen 500 for editing causes to transition to the user add/edit screen 200 in a state where the user icon 264 corresponding to the deleted quick user information is not displayed.

When both of the passwords described above are not collated, that is, when both of the passwords are not matched each other, a small screen called a warning screen, not illustrated, is displayed for a certain period (for example, several seconds). Subsequently, the password input screen 600 is closed, and the state immediately before the password input screen 600 is displayed is reproduced. For example, when the multifunction peripheral 10 includes an audio output including a speaker not illustrated, an appropriate warning message indicating that the passwords cannot be collated may be output, in addition to or instead of displaying the warning screen.

When the cancel button 604 is operated on the password input screen 600, the password input operation on the password input screen 600 is canceled. That is, the password input screen 600 is closed, and the state immediately before the password input screen 600 is displayed is reproduced.

As described above, in the system setting, when the user registration of the user who logs in in the normal login mode is executed, the normal user information is stored. Further, on the quick login screen 100, when the user registration of the user who logs in in the quick login mode is executed, the quick user information is stored.

As described above, the quick login mode is the operation mode provided to reduce the operation performed by the user who logs in in the normal login mode, and may be added to the multifunction peripheral 10 having the normal login mode. In this case, it is conceivable that the normal user information is already registered in the multifunction peripheral 10, and the user with the normal user information already registered (hereinafter referred to as "existing user") registers a new user as a user who logs in in the quick login mode.

Since it is not appropriate for the user with the same login name (that is, login ID) to be registered in a duplicated manner, it is considered that the normal user information of the existing user will be first deleted when the existing user registers the new user who logs in in the quick login mode. The user information usually needs to be deleted by the administrator due to the system setting, which is troublesome.

Therefore, according to the present embodiment, the user having the same login name (login ID) is allowed to be registered in a duplicated manner. Then, when the existing user registers a new user with the same login name in the quick login mode, a configuration capable of selecting whether to associate the new user with the existing user is adopted. Further, when associating the new user with the existing user, adopted is a configuration capable of selecting whether to overwrite the normal user information of the existing user (that is, the registered normal user information), by using the content entered to register the new user who logs in in the quick login mode. In case that the existing user registers the new user with the same login name in the quick login mode, when the existing user selects not to associate the new user with the existing user, the existing user can be registered as another user.

Figure 14:
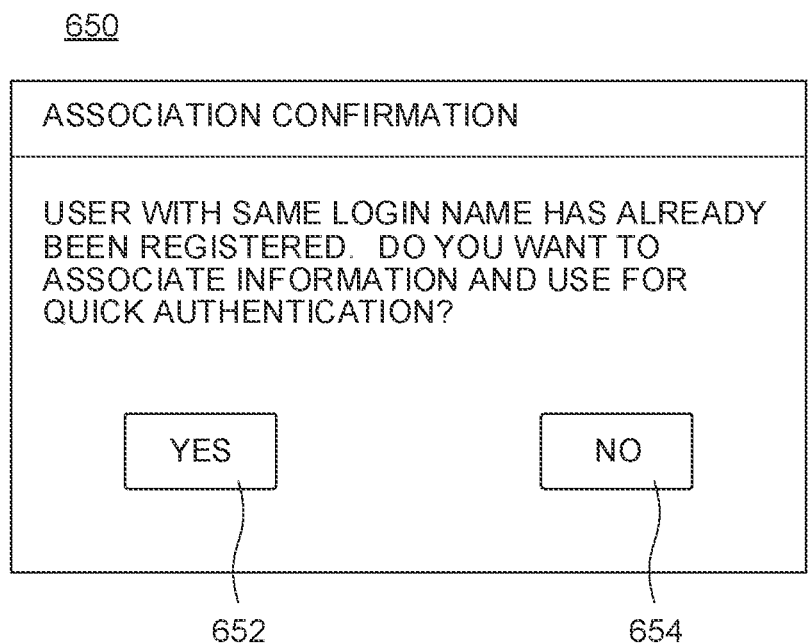
FIG. 14 is a diagram illustrating an example of an association confirmation screen.

In detail, when the registration button 304 is operated on the user registration screen 300 for new registration illustrated in FIG. 8 in order to execute user registration of the new user in the quick login mode, an association confirmation screen (dialog) 650 as illustrated in FIG. 14 is displayed in front of the user add/edit screen 200 illustrated in FIG. 8, before the quick user information is registered.

As illustrated in FIG. 14, in the dialog 650, the title indicating the association confirmation screen is described in the uppermost belt-like portion, and, at the bottom thereof a message for confirming that the user with the same login name has already been registered and whether to associate the new user with the existing user. Further, a button 652 and a button 654 are provided below the message. The button 652 is turned on in selecting to associate the new user with the existing user. The button 654 is turned on in selecting not to associate the new user with the existing user.

That is, when the multifunction peripheral 10 determines that the login name of the existing user matches the login name of the new user, the multifunction peripheral 10 displays the dialog 650, that is, the association confirmation screen, and allows the user to select whether to associate the new user with the existing user.

When the button 654 is turned on, the quick user information for the new user is generated and registered, according to the content entered on the user registration screen 300 for new registration, using a user ID that is different from the user ID of the normal user information of the existing user.

When the button 652 is turned on, it is selected to generate the second management information 450 using the user ID included in the normal user information of the existing user. Further, an overwrite confirmation screen (dialog) 660 as illustrated in FIG. 15 is displayed in front of the user add/edit screen 200 illustrated in FIG. 8, instead of the dialog 650.

Figure 15:
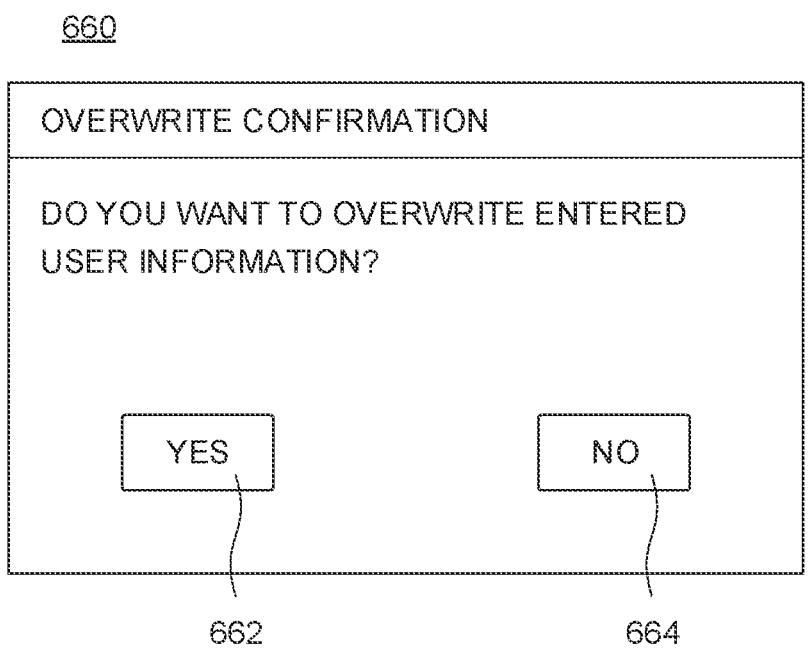
FIG. 15 is a diagram illustrating an example of an overwrite confirmation screen.

As illustrated in FIG. 15, in the dialog 660, the title indicating the overwriting confirmation screen is described in the uppermost belt-like portion, and a message is described to confirm whether to overwrite the information of the new user with the normal user information of the existing user below the uppermost belt-like portion. The information of the new user is the content input on the user registration screen 300 for new registration, and corresponds to the first management information. That is, in the dialog 660, whether to overwrite the first management information of the new user with the normal user information of the existing user associated with the new user is confirmed. A button 662 and a button 664 are provided below the message. The button 662 is turned on when it is selected to overwrite the information of the new user with the normal user information of the existing user. The button 664 is turned on when it is selected not to overwrite the information of the new user with the normal user information of the existing user.

That is, in the multifunction peripheral 10, when it is selected to associate a new user with an existing user by displaying the dialog 660, that is, the overwrite confirmation screen, the multifunction peripheral 10 allows the user to select whether to overwrite the information of the new user with the normal user information of the existing user.

When the button 664 is turned on, the normal user information of the existing user who associates with the new user is used as the first management information 400 of the quick user information, and the second management information 450 is generated using the user ID included in the normal user information of the existing user, that is, the quick user information is generated and registered.

When the button 662 is turned on, the first management information 400 based on the content input on the user registration screen 300 for new registration overwrites the normal user information of the existing user who associates with the new user, and the second management information 450 is generated using the user ID included in the normal user information of the existing user, that is, the quick user information is generated and registered.

That is, when it is selected to associate a new user with an existing user, regardless of whether the information of the new user is overwritten with the normal user information of the existing user, the user ID included in the normal user information is set in the quick user information.

It is possible to register the new user of the quick login in association with the normal user information of the existing user as described above. Therefore, in case that the association is executed as mentioned above, when the user is deleted in the quick login mode, the first management information 400 including the user ID of the user is deleted from the auxiliary storage 18, and the second management information 450 including the user ID of the user is deleted from the main storage 16b. Similarly, in the system setting, when the user is deleted, the first management information 400 including the user ID of the user is deleted from the auxiliary storage 18. Further, when the second management information 450 including the user ID of the user is stored in the main storage 16b, the second management information 450 is also deleted. However, even users with the same login ID and the user name, the normal user information with different user Ds is not deleted.

Note that, described above, in the case of the general user, when the user is deleted, the password is collated.

Figure 16:
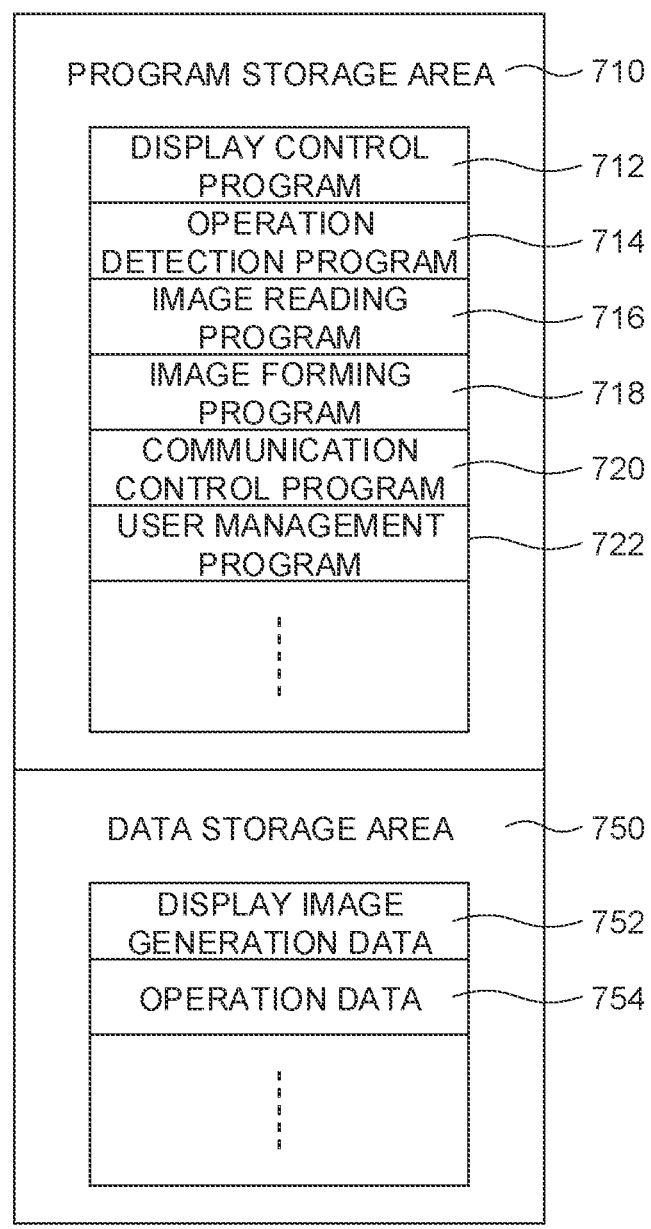
FIG. 16 is a memory map conceptually illustrating a configuration in a random access memory (RAM) of a main memory illustrated in FIG. 1.

FIG. 16 illustrates a memory map 700 that conceptually represents the configuration in the RAM of the main storage 16b. As illustrated in the memory map 700, the RAM has a program storage area 710 and a data storage area 750. The program storage area 710 stores the control program described above. More specifically, the control program includes a display control program 712, an operation detection program. 714, an image reading program 716, an image forming program 718, a communication control program 720, a user management program 722, and the like.

The display control program 712 is a program for generating display screen data necessary for causing the display 22a to display various screens such as the quick login screen 100 and the user add/edit screen 200. The operation detection program 714 is a program for detecting the operation state on the touch panel 24a. The image reading program 716 is a program for controlling the image reader 12. The image forming program 718 is a program for controlling the image generator 14. The communication control program 720 is a program for controlling the communicator 20. The user management program 722 is a program for causing the CPU 16a to execute user management processing (see FIGS. 17 and 18) to be described later.

On the other hand, various types of data are stored in the data storage area 750. The various types of data are display image generation data 752, operation data 754, and the like.

The display image generation data 752 is data such as polygon data and texture data used to generate the display screen data based on the display control program 712 described above. The operation data 754 is data indicating the operation state on the touch panel 24a. Specifically, the operation data 754 is time-series data indicating the touch position (coordinates) of the user on the touch panel 24a.

Figure 17:
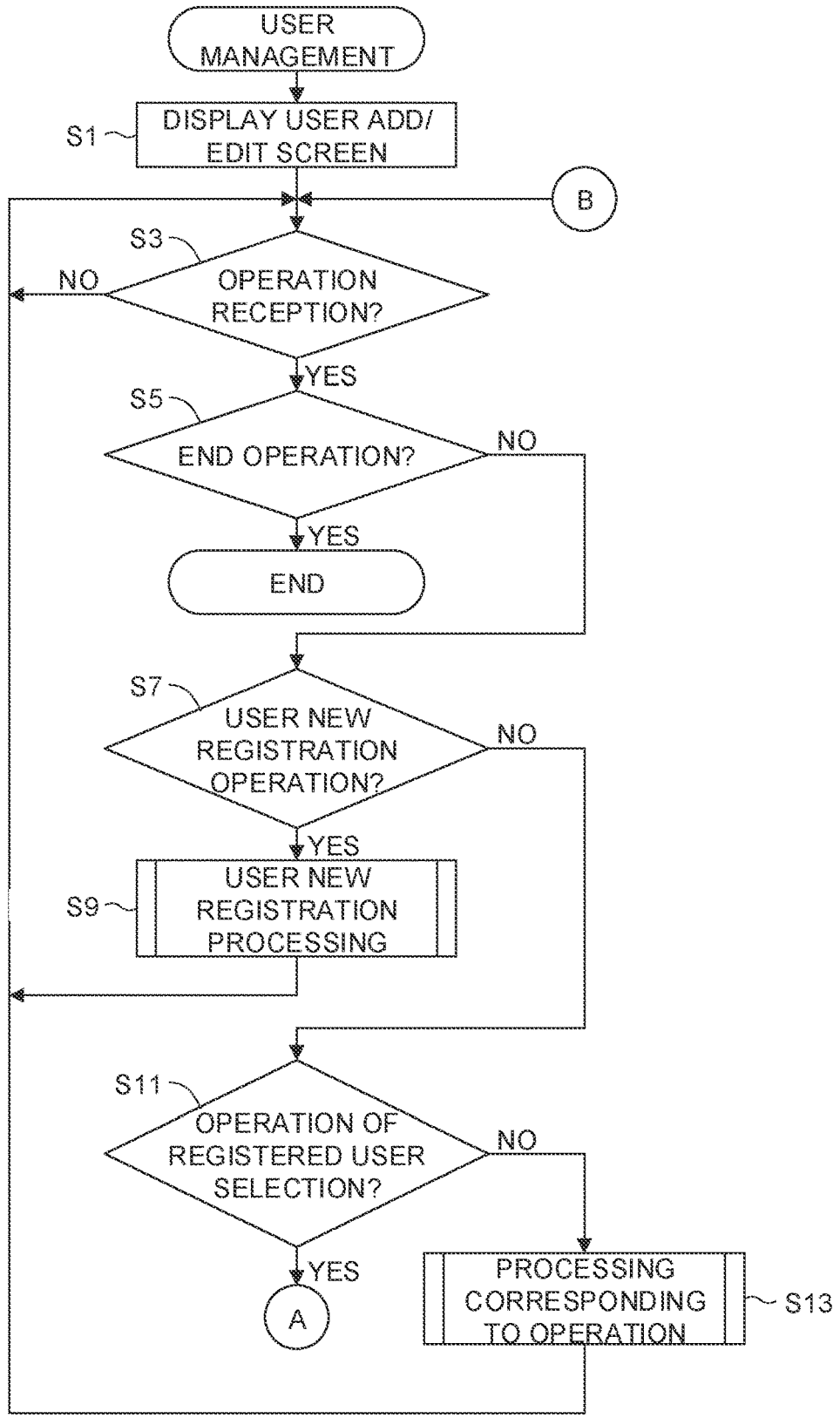
FIG. 17 is a flowchart illustrating a portion of user management processing of a central computing unit (CPU) illustrated in FIG. 1.
Figure 18:
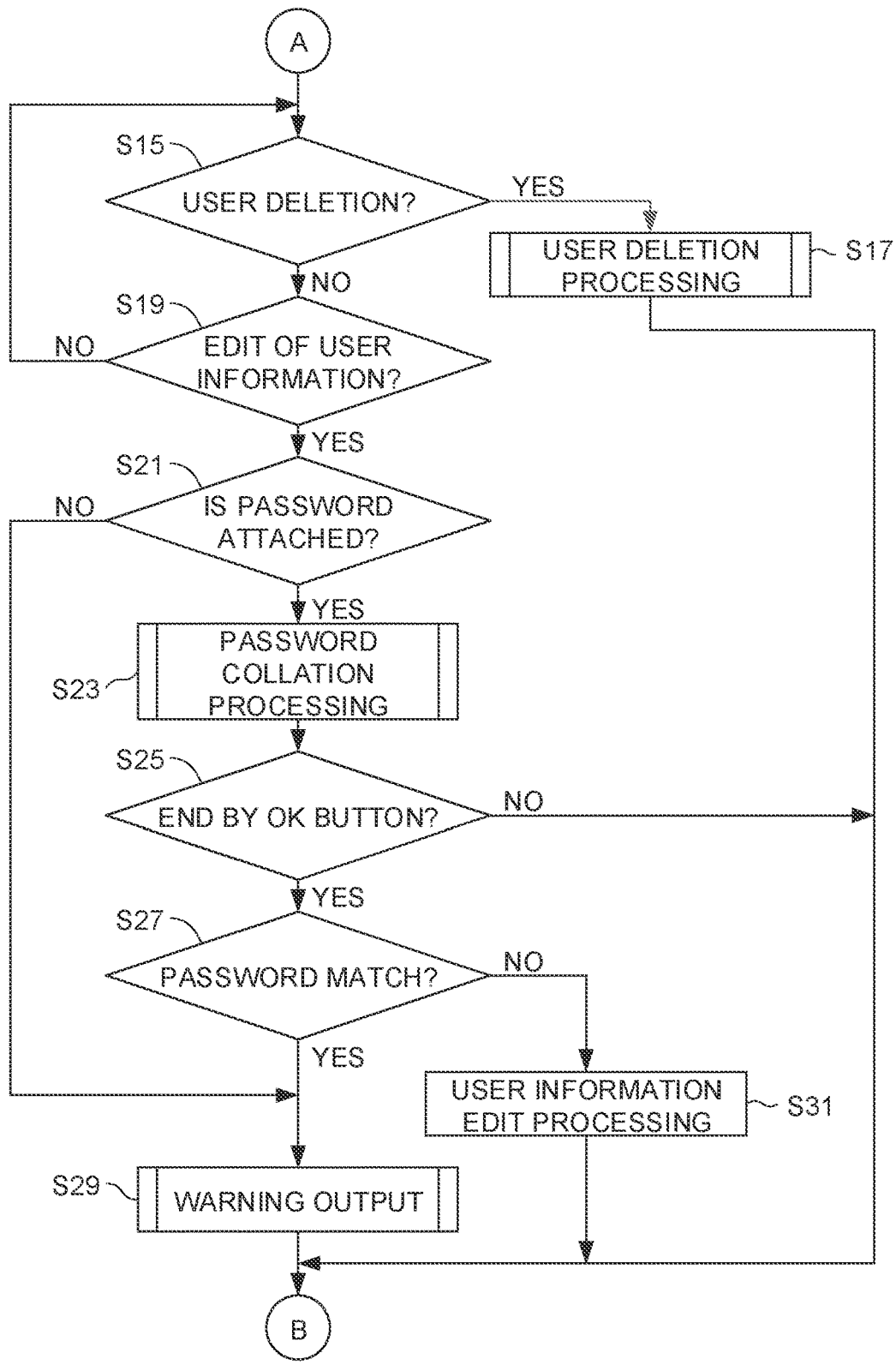
FIG. 18 is a flowchart illustrating another portion of the user management processing of the CPU illustrated in FIG. 1, subsequent to FIG. 17.

As described above, according to the present embodiment, it is possible to appropriately register and manage the quick user information. In order to achieve this, the CPU 16a executes a user management task in accordance with the user management program 722 described above (FIG. 16). The flow of the user management task is illustrated in FIGS. 17 and 18. The CPU 16a executes the user management task in response to pressing the user add/edit button 154a in the action panel 154 on the quick login screen 100.

According to the user management task, the CPU 16a first displays the user add/edit screen 200 on the display 22a in step S1. The content displayed on the user add/edit screen 200 is based on the contents of the first management information 400 and the second management information 450.

In the next step S3, the CPU 16a waits for the operator 24 including the touch panel 24a to receive a certain operation (S3: NO). Then, when the operator 24 receives the certain operation (S3: YES), in step S5, the CPU 16a determines whether the operation received in step S3 is an end operation. The end operation here refers to an operation of the return button in the action panel 254 of the user add/edit screen 200 or an operation of the home button that constitutes the operator 24.

In step S5, for example, when the operation received in step S3 is the end operation (S5: YES), the CPU 16a ends the user management task. Then, the CPU 16a returns to the quick login mode by executing another task (quick login task), not illustrated, and first displays the quick login screen 100 on the display 22a. The display of the quick login screen 100 is based on the contents of the first management information 400 and the second management information 450.

On the other hand, when the operation received in step S3 is not the end operation (S5: NO), in step S7, the CPU 16a determines whether the operation received in step S3 is a new registration operation of the user, that is, whether any unregistered icon 244 has been operated. For example, when the operation received in step S3 is a new registration operation of the user (S7: YES), the CPU 16a advances the process to step S9. On the other hand, when the operation received in step S3 is not a new registration operation of the user (S7: NO), the CPU 16a advances the process to step S11 described later.

In step S9, the CPU 16a executes user new registration processing. In the user new registration processing, the CPU 16a executes appropriate processing for newly registering the user, including displaying the user registration screen 300 for new registration. After executing the user new registration processing, the CPU 16a returns the process to step S3. At this time, the CPU 16a closes the user registration screen 300 for new registration. Although the detailed explanation including illustration is omitted, when a user is newly registered in the user new registration processing, the CPU 16a updates the contents of the first management information 400 and the second management information 450, and then redisplays the user add/edit screen 200, based on the contents of the first management information 400 and the second management information 450, which are updated.

In step S11, the CPU 16a determines whether the operation received in step S3 described above is an operation for selecting a registered user, that is, whether any of the user icons 264 has been operated. For example, when the operation received in step S3 is an operation for selecting the registered user (S11: YES), the CPU 16a advances the process to step S15 (see FIG. 18) described later. On the other hand, when the operation received in step S3 is not an operation for selecting the registered user (S11: NO), the CPU 16a advances the process to step S13.

In step S13, the CPU 16a executes the processing corresponding to the operation received in step S3. The processing in step S13 includes page switching according to the operation of the page switch button 246 on the user add/edit screen 200, opening and closing of the action panel 254 according to the operation of the tab 252, and the like. After executing the step S13, the CPU 16a returns the process to the step S3.

As illustrated in FIG. 18, in step S15, the CPU 16a determines whether the operation received in step S3 described above is the deletion of the registered user. That is, the CPU 16a determines whether it has been instructed to delete the quick user information for the selected registered user. For example, when the operation is the deletion of the user S15: YES), the CPU 16a advances the process to step S17, executes user deletion processing described later, and then returns the process to step S3.

On the other hand, when the operation is not the deletion of the user (S15: NO), the CPU 16a determines in step S19 whether the operation is the edit of other quick user information. For example, when the operation is not the edit of other quick user information (S19: NO), the CPU 16a returns the process to step S15. On the other hand, when the operation is the edit of other quick user information (S19: YES), in step S21, the CPU 16a determines whether a password is attached to the quick user information related to the user icon 264 operated in step S3, that is, the quick user information to be edited. The determination is based on the presence or absence of the setting of the password included in the second management information 450. This is the same also in the deletion processing (see FIG. 20) of the user, which will be described later. For example, when no password is attached (S21: NO), the CPU 16a advances the process to step S29, which will be described later. On the other hand, when a password is attached (S21: YES), the CPU 16a advances the process to step S23.

In step S23, the CPU 16a executes password collation processing. In the password collation processing, the CPU 16a executes an appropriate process for collating the password, including displaying the password input screen 600. After executing the password collation processing, in detail, in response to the operation of the cancel button 604 or the OK button 606 on the password input screen 600, the CPU 16a advances the process to step S25. At this time, the CPU 16a closes the password input screen 600. The password collation processing is also the same in the deletion processing of the user described later.

In step S25, the CPU 16a determines whether the end of the password collation processing in step S23 is the end based on the operation of the OK button 606 on the password input screen 600. For example, when the end is the end based on the operation of the OK button 606 (S25: YES), the CPU 16a advances the process to step S27. On the other hand, when the end is not the end based on the operation of the OK button 606, that is, when the end is the end based on the operation of the cancel button 604 (S25: NO), the CPU 16a returns the process to step S3.

In step S27, the CPU 16a determines whether the password has been collated by the password collation processing in step S23, that is, whether the password entered on the password input screen 600 matches the registered password. For example, when the password has been collated (S27: YES), the CPU 16a advances the process to step S29. On the other hand, when the password has not been collated (S27: NO), the CPU 16a advances the process from step S27 to step S31, which will be described later.

In step S23, the CPU 16a executes user information editing processing. In the user information editing processing, the CPU 16a executes appropriate processing for editing the quick user information to be edited, including displaying the user registration screen 500 for editing. After executing the quick user information editing processing, the CPU 16a returns the process to step S3. At this time, the CPU 16a closes the user registration screen 500 for editing. Although the detailed explanation including illustration is omitted, when the quick user information is edited (changed) in the quick user information editing processing, the CPU 16a updates the content of the first management information 400 and/or the second management information 450, and redisplays the user add/edit screen 200, based on the content of the first management information 400 and/or the second management information 450, which are updated.

In contrast, in step S31, the CPU 16a outputs a warning indicating that the password cannot be collated, and in detail, displays the above-described warning screen for a certain period. In step S31, in addition to or in place of displaying the warning screen, the above-described voice warning message may be output. After executing the step S31, the CPU 16a, returns the process to step S3.

Figure 19:
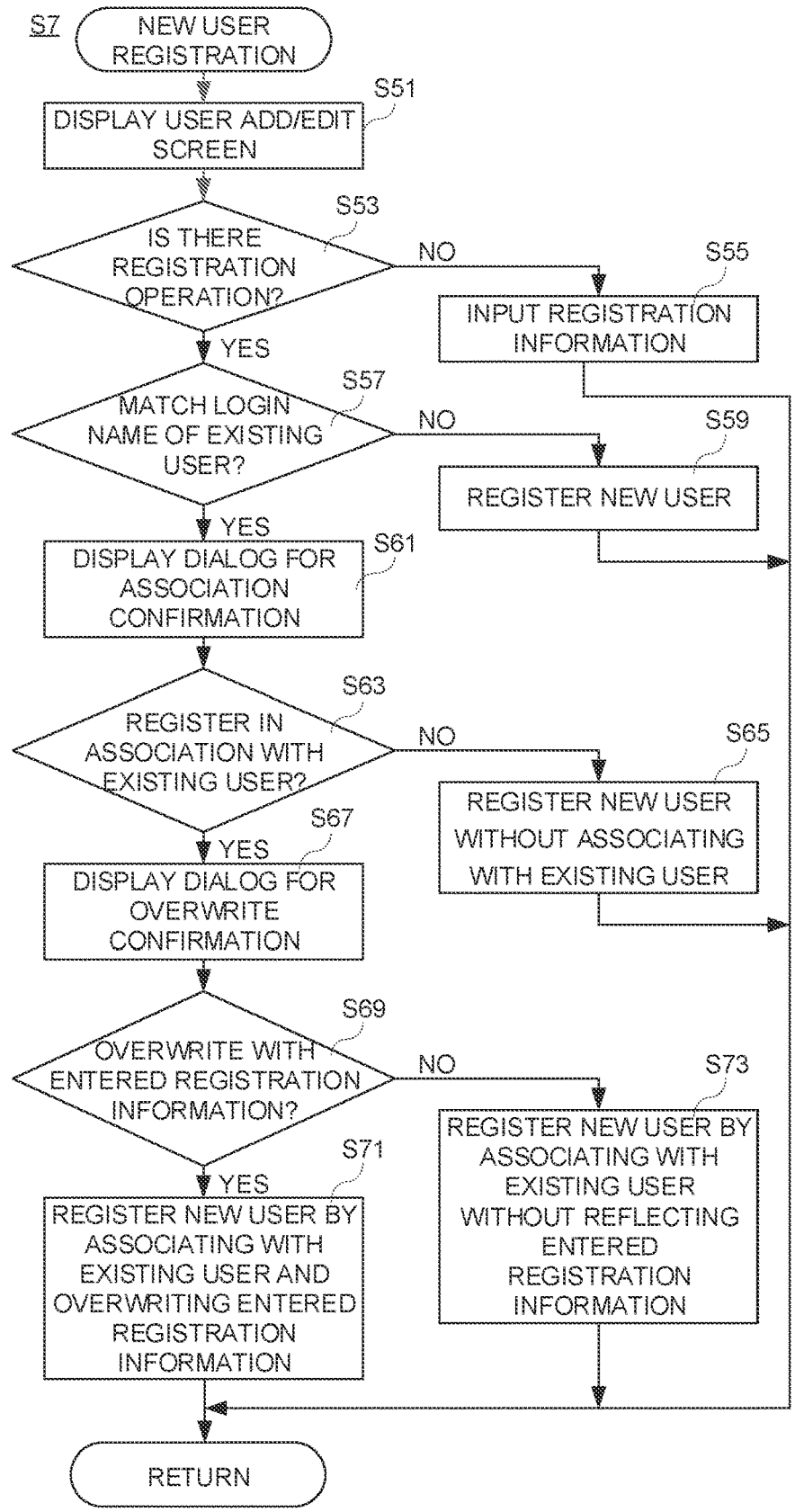
FIG. 19 is a flowchart illustrating an example of new user registration processing of the CPU illustrated in FIG. 1.

FIG. 19 illustrates the flow of the user new registration processing in step S9 illustrated in FIG. 17. As illustrated in FIG. 19, when the CPU 16a starts new user registration processing, in step S51, the CPU 16a displays, on the display 22a, the user add/edit screen 200 on which the user registration screen 300 for new registration as illustrated in FIG. 8 is displayed.

In the next step S53, the CPU 16a, determines whether the operation received in step S3 is a registration operation. The registration operation is an operation of the registration button 304 on the user registration screen 300 for new registration.

In step S53, for example, when the operation received in step S3 is not the registration operation (S53: NO), the CPU 16a displays the input registration information in step S55, ends the new user registration processing, and returns to the user management processing. However, when the registration information is not input, the processing in step S55 is skipped.

On the other hand, when the operation received in step S3 is the registration operation (S53: YES), the CPU 16a determines whether the login name of the user to be newly registered matches the login name of the existing user in step S57.

In step S57, when the login name of the user to be newly registered does not match the login name of the existing user (S57: NO), in step S59, the CPU 16a registers a new user, ends the new user registration processing, and returns to the user management processing. In other words, in step S59, the CPU 16a stores the first management information 400 of the new user in the auxiliary storage 18, and stores the second management information 450 of the new user in the main storage 16b.

On the other hand, when the login name of the user to be newly registered matches the login name of the existing user (S57: YES), in step S61, the CPU 16a displays the dialog 650 for confirming the association as illustrated in FIG. 14, In the next step S63, the CPU 16a determines whether to register the new user in association with the existing user. Here, when the button 652 is turned on, the CPU 16a determines to register the new user in association with the existing user. When the button 654 is turned on, the CPU 16a determines that the new user is not registered in association with the existing user.

In step S63, when the new user is not registered in association with the existing user (S63: NO), in step S65, the CPU 16a registers the new user without associating with the existing user. The processing in step S65 is the same as that in step S59, and therefore, the duplicate description thereof will be omitted.

On the other hand, when a new user is registered in association with the existing user (S63: YES), in step S67, the CPU 16a displays the dialog 660 for confirming overwriting as illustrated in FIG. 15, and in the next step S69, determines whether to overwrite with the input registration information. That is, the CPU 16a determines whether to overwrite the normal user information of the existing user with the registration information that is input this time. Here, when the button 662 is turned on, the CPU 16a, determines that the normal user information of the existing user is overwritten with the entered registration information. On the other hand, when the button 664 is turned on, the CPU 16a determines that the normal user information of the existing user is not overwritten with the entered registration information.

In step S69, when the normal user information of the existing user is overwritten with the entered registration information (S69: YES), in step S71, the CPU 16a associates with the existing user, overwrites with the input registration information, registers the new user, ends the new user registration processing, and returns to the user management processing. That is, in step S71, the CPU 16a stores the first management information 400 of the new user in the auxiliary storage 18, and stores the second management information 450 of the new user in the main storage 16b, by using the user ID of the existing user and the input registration information.

On the other hand, when the normal user information of the existing user is not overwritten with the input registration information (S69: NO), in step S73, without reflecting the input registration information, the CPU 16a associates with the existing user, registers the new user, ends the new user registration processing, and returns to the user management processing. That is, in step S73, the CPU 16a stores the first management information 400 of the new user in the auxiliary storage 18, and stores the second management information 450 of the new user in the main storage 16b by using the user ID of the existing user without using the input registration information.

Figure 20:
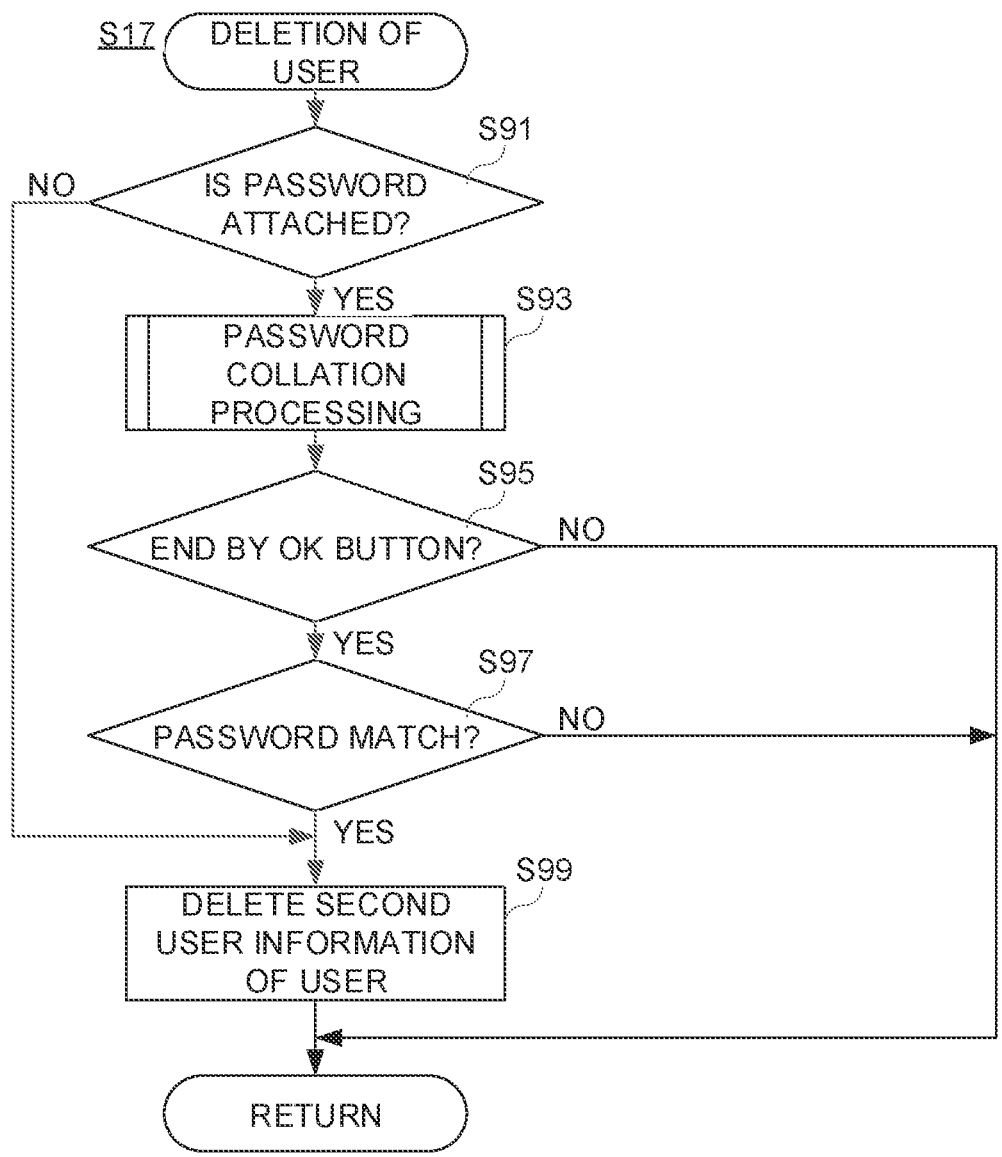
FIG. 20 is a flowchart illustrating an example of user deletion processing of the CPU illustrated in FIG. 1.

FIG. 20 illustrates the flow of the deletion processing of the user in step S17 illustrated in FIG. 18, As illustrated in FIG. 20, when the CPU 16a starts the deletion processing of the user, the CPU 16a determines whether a password is attached in step S91.

In step S91, when no password is attached (S91: NO), the CPU 16a advances the process to step S99. On the other hand, when a password is attached (S91: YES), the CPU 16a advances the process to step S93.

In step S93, the CPU 16a executes the password collation processing. In the next step S95, the CPU 16a determines whether the end of the password collation processing in step S93 is the end based on the operation of the OK button 606 on the password input screen 600. For example, when the end is the end based on the operation of the OK button 606 (S95: YES), the CPU 16a advances the process to step S97. On the other hand, when the end is not the end based on the operation of the OK button 606, that is, the end based on the operation of the cancel button 604 (S95: NO), the CPU 16a, ends the deletion processing of the user, and returns to the user management processing.

In step S97, the CPU 16a determines whether the password input on the password input screen 600 matches the password that has already been registered. For example, when the two passwords match each other (S97: YES), the CPU 16a advances the process to step S99. On the other hand, when the two passwords do not match each other (S97: NO), the CPU 16a ends the deletion processing of the user, and returns to the user management processing.

In step S99, the CPU 16a deletes the quick user information of the user who is instructed to delete, that is, the first management information 400 and the second management information 450. For example, the CPU 16a deletes the second management information 450 from the main storage 16b, and then deletes the first management information 400 from the auxiliary storage 18.

Note that, although not illustrated, in case that the user is the administrator who has logged in by operating the administrator login button 128, when instructed to delete the user, the processing of steps S91 to S97 are not executed, and the quick user information of the user instructed to delete is deleted.

As described above, according to the present embodiment, in case of registering a new user who logs in in the quick login mode, when the user with the same login ID as the user is registered as the existing user by the system setting, the quick user information of the new user is associated with the normal user information of the existing user, based on the selection of the user. Therefore, even if the new user has been registered as the user who logs in in the normal login mode, the new user can be registered as the user who logs in in the quick login mode without deleting the registered normal user information. Further, when the quick user information of the new user is not associated with the normal user information of the existing user, the users with the same login ID are registered in a duplicated manner. However, the normal user information and the quick user information are managed using different user IDs. That is, it is possible to appropriately manage the user information, and to save the time and effort for registering the user.

Further, according to the present embodiment, in case of registering a user who logs in in the quick login mode, when the user is associated with the existing user registered in the system setting, the first management information and the second management information, which have the same user ID and correspond to the normal user information, are deleted when deleting the user. Therefore, it is possible to prevent the memory capacity from being overwhelmed by unnecessary user information.

The above embodiments are specific embodiments of the present invention, and are not intended to limit the technical scope of the present invention. The present invention can also be applied to other aspects.

For example, instead of the user icon 144 or 264 as the operation item, an operation item of another aspect such as a button may be employed.

Further, the quick user information may be registered by operating each of the PCs 30, instead of operating the main body of the multifunction peripheral 10. Further, it is possible to edit, for example, delete the quick user information by operating each of the PCs 30.

Further, in the embodiments described above, an example in which the present invention is applied to the multifunction peripheral 10 has been described. However, the present invention is not limited to the above examples. As a matter of course, the present invention can be applied to an information processing apparatus other than the multifunction peripheral 10.

DESCRIPTION OF REFERENCE NUMERALS

10 . . . MULTIFUNCTION PERIPHERAL
16 . . . CONTROLLER

16A ... CPU
20 ... COMMUNICATOR
22 ... DISPLAY UNIT
22A ... DISPLAY
24 ... OPERATOR
24A ... TOUCH PANEL
50 ... NORMAL LOGIN USER REGISTRATION SCREEN
100 ... QUICK LOGIN SCREEN
144, 264 ... USER ICON
200 ... USER ADD/EDIT SCREEN
254 ... ACTION PANEL
254B ... DELETE BUTTON
500 ... USER REGISTRATION SCREEN FOR EDITING
600 ... PASSWORD INPUT SCREEN

What is claimed is:

1. An information processing apparatus, comprising:
a memory that stores first user information of a first user for a first user authentication and second user information of a second user for a second user authentication different from the first user authentication, the first user authentication and the second user authentication in association with each other, wherein
the second user information includes first management information corresponding to the first user information and second management information different from the first management information, and
the first user authentication and the second user authentication are associated with each other by including a same user identifier (ID) in each of the first management information and the second management information,
the memory further storing instructions, which when executed by a processor of the information processing apparatus, cause the processor to
edit, when the second management information of the second user stored in the memory is edited, the first management information in association with the edition of the second management information.

2. The information processing apparatus according to claim 1, wherein
when the second user information is attached with a password, the editions of the first management information and the second management information are allowed on a condition that the password is input, and when the second user information is not attached with a password, the editions of the first management information and the second management information are allowed unconditionally.

3. The information processing apparatus according to claim 1, wherein the first user authentication is performed using a login name and a password.

4. The information processing apparatus according to claim 1, further comprising a display, wherein the second user authentication is performed by an operation on an operation item displayed on the display.

5. The information processing apparatus according to claim 1, wherein the editions of the first and second management information include deletions of the first management information and the second management information.

6. A user management method in an information processing apparatus, wherein
the information processing apparatus comprises a memory that stores first user information of a first user for a first user authentication and second user information of a second user for a second user authentication different from the first user authentication, the first user authentication and the second user authentication in association with each other,
the second user information includes first management information corresponding to the first user information and second management information different from the first management information, and
the first user authentication and the second user authentication are associated with each other by including a same user identifier (ID) in each of the first management information and the second management information, the method comprising
editing, when the second management information of the second user stored in the memory is edited, the first management information in association with the edition of the second management information.

* * * * *